(12) United States Patent
Ojala

(10) Patent No.: US 11,047,674 B2
(45) Date of Patent: Jun. 29, 2021

(54) METHOD AND APPARATUS FOR MEASURING THE HEIGHT OF A SURFACE

(71) Applicant: Teknologian tutkimuskeskus VTT Oy, Espoo (FI)

(72) Inventor: Kai Ojala, Vtt (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 6 days.

(21) Appl. No.: 15/760,796

(22) PCT Filed: Sep. 21, 2016

(86) PCT No.: PCT/FI2016/050657
§ 371 (c)(1),
(2) Date: Mar. 16, 2018

(87) PCT Pub. No.: WO2017/051074
PCT Pub. Date: Mar. 30, 2017

(65) Prior Publication Data
US 2018/0252516 A1    Sep. 6, 2018

(30) Foreign Application Priority Data

Sep. 22, 2015  (FI) ..................................... 20155675

(51) Int. Cl.
*G01B 11/24*         (2006.01)
*G01B 11/06*         (2006.01)
(Continued)

(52) U.S. Cl.
CPC .......... *G01B 11/24* (2013.01); *G01B 11/0608* (2013.01); *G02B 13/22* (2013.01); *G02B 27/4205* (2013.01)

(58) Field of Classification Search
CPC ... G01B 11/24; G01B 11/0608; G01B 11/026; G01B 11/14; G01B 11/22; G01B 11/25; G02B 13/22; G02B 27/4205
See application file for complete search history.

(56) References Cited

U.S. PATENT DOCUMENTS 4,725,721 A  *  2/1988  Nakamura ........... G11B 7/1381
                                                250/201.5
5,165,063 A  *  11/1992  Strater ................ G01B 11/026
                                                250/201.4
(Continued)

FOREIGN PATENT DOCUMENTS

DE           3435033 A1     4/1986

OTHER PUBLICATIONS

International Search Report, Application No. PCT/FI2016/050657, dated Nov. 23, 2016, 2 pages.
(Continued)

*Primary Examiner* — Mohamed K Amara
(74) *Attorney, Agent, or Firm* — Ziegler IP Law Group, LLC

(57) ABSTRACT

A measuring device includes an illuminating unit arranged to project an illuminating light beam on a surface of a target object so as to form an illuminated region on the surface, an image sensor, and focusing optics arranged to form a focused spot on the image sensor by focusing light reflected from the illuminated region such that the position of the spot depends on the height of the surface with respect to a reference plane, wherein the device is configured to determine a height of the surface from a detected position of the focused spot, and wherein the normal of the image sensor is inclined with respect to the optical axis of the focusing optics.

12 Claims, 14 Drawing Sheets

(51) Int. Cl.
*G02B 13/22* (2006.01)
*G02B 27/42* (2006.01)

(56) References Cited

U.S. PATENT DOCUMENTS

| | | | | |
|---|---|---|---|---|
| 5,329,358 A * | 7/1994 | Horijon | G01B 11/026 | 356/609 |
| 5,581,345 A * | 12/1996 | Oki | G01B 11/0608 | 356/4.01 |
| 5,696,589 A * | 12/1997 | Bernacki | G01B 11/06 | 250/201.4 |
| 5,880,846 A * | 3/1999 | Hasman | G01B 11/2509 | 356/602 |
| 5,929,983 A * | 7/1999 | Lu | G01B 11/0608 | 356/138 |
| 5,978,091 A * | 11/1999 | Jann | G01B 11/02 | 356/426 |
| 6,208,465 B1 | 3/2001 | Schaham | | |
| 6,428,171 B1 * | 8/2002 | Aoki | G01B 11/0608 | 250/559.38 |
| 6,622,392 B1 * | 9/2003 | Bourget | G01C 15/002 | 33/293 |
| 6,657,216 B1 * | 12/2003 | Poris | G01B 11/0608 | 250/216 |
| 7,369,225 B2 * | 5/2008 | Messerschmidt | G01B 11/306 | 356/241.1 |
| 7,561,273 B2 * | 7/2009 | Stautmeister | G01B 11/24 | 356/445 |
| 8,328,731 B2 * | 12/2012 | Hessel | A61B 5/0062 | 181/129 |
| 8,736,847 B2 * | 5/2014 | Shirley | G01B 11/2441 | 356/510 |
| 8,810,800 B2 * | 8/2014 | Shirley | G02B 27/48 | 356/610 |
| 10,327,872 B2 * | 6/2019 | Verker | A61C 9/0066 | |
| 10,504,386 B2 * | 12/2019 | Levin | G06F 3/0481 | |
| 10,507,087 B2 * | 12/2019 | Elbaz | A61B 1/0638 | |
| 10,634,485 B2 * | 4/2020 | Gross | G01B 11/0608 | |
| 2002/0075484 A1 * | 6/2002 | Cohen-Sabban | G01B 11/2509 | 356/603 |
| 2004/0109170 A1 * | 6/2004 | Schick | G02B 21/0064 | 356/614 |
| 2004/0145753 A1 * | 7/2004 | Lim | G01B 11/2509 | 356/602 |
| 2004/0169850 A1 * | 9/2004 | Meeks | G01B 11/303 | 356/237.2 |
| 2005/0225752 A1 * | 10/2005 | Takai | G01N 21/4795 | 356/237.1 |
| 2005/0226278 A1 * | 10/2005 | Gu | H01S 3/0057 | 372/6 |
| 2006/0077385 A1 * | 4/2006 | Wang | G01J 3/02 | 356/328 |
| 2008/0049235 A1 * | 2/2008 | Crowther | G01B 11/2433 | 356/601 |
| 2008/0137061 A1 * | 6/2008 | Rush | G01B 11/0608 | 356/4.04 |
| 2011/0273709 A1 * | 11/2011 | Sweeney | G01J 3/02 | 356/320 |
| 2012/0019821 A1 * | 1/2012 | Chen | G02B 21/0032 | 356/303 |
| 2012/0203086 A1 * | 8/2012 | Rorabaugh | A61B 3/1173 | 600/321 |
| 2012/0206710 A1 * | 8/2012 | Niemela | G01B 11/065 | 356/4.07 |
| 2013/0028611 A1 * | 1/2013 | Amit | G02B 6/4201 | 398/152 |
| 2013/0114059 A1 * | 5/2013 | Jak | G21K 1/10 | 355/67 |
| 2013/0248695 A1 * | 9/2013 | Macintyre | A61B 5/1455 | 250/227.11 |
| 2013/0301042 A1 | 11/2013 | Urano et al. | | |
| 2014/0146297 A1 * | 5/2014 | Vainer | G01N 21/94 | 355/30 |
| 2014/0268146 A1 * | 9/2014 | Hinnrichs | G01J 3/18 | 356/364 |
| 2015/0104199 A1 * | 4/2015 | Ye | G02F 1/0147 | 398/212 |
| 2015/0219454 A1 * | 8/2015 | Keranen | G01N 21/8422 | 356/4.07 |
| 2016/0142148 A1 * | 5/2016 | Marpaung | H04B 10/07955 | 398/38 |

OTHER PUBLICATIONS

Finnish Patent and Registration Office, Office Action, Application No. 20155675, dated Mar. 8, 2016, 6 pages.
Written Opinion of the International Searching Authority, Application No. PCT/FI2016/050657, dated Nov. 23, 2016, 5 pages.
European Patent Office, Office Action, Application No. 16774695.1, dated Apr. 2, 2020.

* cited by examiner

METHOD AND APPARATUS FOR MEASURING THE HEIGHT OF A SURFACE

FIELD

Some versions may relate to measuring the height of a surface.

BACKGROUND

The three-dimensional shape of an object may be measured e.g. by using structured light. A stripe pattern comprising a plurality of stripes may be projected on the surface of the object, and an image of the stripe pattern may be captured by a camera. The stripe pattern appearing in the captured image may be geometrically deformed when compared with the projected stripe pattern. The three-dimensional shape of the object may be determined by comparing the captured image with the projected pattern. The height of the surface at a selected location may be determined by comparing the captured image with the projected pattern.

SUMMARY

Some versions may relate to an apparatus for measuring the height of a surface. Some versions may relate to an apparatus for monitoring the height of a surface. Some versions may relate to a method for measuring the height of a surface. Some versions may relate to a method for monitoring the height of a surface. Some versions may relate to a method for measuring the three dimensional shape of a surface.

According to an aspect, there is provided a measuring device (500), comprising:
- an illuminating unit (100) arranged to project an illuminating light beam (LB1) on a surface (SRF1) of a target object (OBJ1) so as to form an illuminated region (E1) on the surface (SRF1),
- an image sensor (300), and
- focusing optics (200) arranged to form a focused spot (E2) on the image sensor (300) by focusing light ($LB2_k$) reflected from the illuminated region (E1) such that the position ($u_k$) of the spot (E2) depends on the height ($z_k$) of the surface (SRF1) with respect to a reference plane (PLN1),
- wherein the normal (N3) of the image sensor (300) is inclined with respect to the optical axis (AX2) of the focusing optics (200).

According to an aspect, there is provided a method, comprising:
- forming an illuminated region (E1) on the surface (SRF1) of a target object (OBJ1), and
- forming a focused spot (E2) on an image sensor (300) by focusing light ($LB2_k$) reflected from the illuminated region (E1) such that the position ($u_k$) of the spot (E2) depends on the height ($z_k$) of the surface (SRF1) with respect to a reference plane (PLN1), wherein the light is focused by focusing optics (200),
- detecting the position ($u_k$) of the spot (E2), and
- determining the height ($z_k$) of the surface (SRF1) from the detected position ($u_k$) of the focused spot (E2),
- wherein the normal (N3) of the image sensor (300) is inclined with respect to the optical axis (AX2) of the focusing optics (200).

Further aspects are defined in the claims.

The height of a surface may also be called e.g. as the elevation of the surface. The measuring device may be arranged to measure the height of a surface at a selected location.

During operation, the measuring device may form an illuminated spot, an illuminated region, and a focused spot. The illuminated spot may "float" slightly above the surface, the illuminated region coincides with the surface, and the focused spot is formed on an image sensor.

The measuring device may form the illuminated region on the surface of a target object. Light reflected from the illuminated region may be focused on the image sensor to form a focused spot. The light may be focused on the image sensor such that the position of the focused spot depends on the surface height at the selected location. The height of the surface may be determined from the detected position of the focused spot.

The measuring device may comprise illuminating optics to form the illuminated spot near the surface of a target object. The illuminated spot may be slightly above the illuminated region, or the illuminated spot may coincide with the illuminated region.

The measuring device may comprise focusing optics to collect light reflected from the illuminated region to the image sensor. The surface of the target object may be glossy and/or diffusing. The glossy surface may reflect light of illuminated spot to the focusing optics.

In case of the glossy surface, the focusing optics may form an image of the illuminated spot on the image sensor. The focused spot formed on the image sensor may be an image of the illuminated spot. In case of the glossy surface, the focused spot formed on the image sensor may be a substantially sharp image of the illuminated spot.

In case of a diffusing surface, the measuring device may form an image of the illuminated region on the image sensor. In case of the diffusing surface, the focused spot formed on the image sensor may be an image of the illuminated region. The measuring device may form the focused spot on the image sensor such that position of the spot may depend on the height of the surface at a selected location.

The measuring device may be arranged to monitor and/or measure the height of a surface at a selected location. The surface may be e.g. an interface between a solid and a gas. The surface may be e.g. an interface between a liquid and a gas. The surface may be e.g. an interface between a first solid material and a second solid material. The surface may be e.g. an interface between a first liquid and a second liquid.

The illuminated spot may be formed e.g. by using narrowband light. In particular, the illuminated spot may be formed by using substantially monochromatic light. The substantially monochromatic light may be provided e.g. by using a laser. Consequently, the optical elements of the measuring device do not need to compensate chromatic aberration. The absence of chromatic aberration may improve the accuracy and/or speed of the measurement. The absence of chromatic aberration may reduce the manufacturing costs of the device. When using monochromatic light, the optics may comprise e.g. singlet lenses to reduce manufacturing costs.

The measuring device may be implemented without using spectrally selective components. This may reduce manufacturing costs of the measuring device.

The numerical aperture of the illuminating optics and the numerical aperture of the focusing optics may be selected such that the orientation of the surface of the target object does not have a significant effect on the accuracy of the height measurement, provided that the tilt angle of the surface is kept within a predetermined range.

The measuring device may comprise a telecentric optical system, which may be arranged to form the focused spot on the image sensor, by collecting light reflected from the illuminated region. The telecentric system may be a double telecentric optical system. By using the telecentric optical system, the degree of blurring of the focused spot may be reduced and/or minimized.

The surface of the target object may be glossy and/or diffusing. The numerical aperture of the illuminating optics and the numerical aperture of the telecentric focusing optics may be selected such that the degree of gloss of the surface of the target object does not have a significant effect on the accuracy of the height measurement, provided that the tilt angle of the surface is kept within a predetermined range.

The measuring device may be arranged to measure e.g. the three dimensional (3D) topography of a surface. The device may be arranged to measure one or more surface height values at selected locations of the surface. The device may be arranged to measure the profile of a surface.

The device may be used e.g. for biomedical applications. For example, the device may be arranged to measure the shape of the cornea of an eye. For example, the device may be arranged to measuring the shape of the surface of skin, e.g. in order to detect a skin defect.

The measuring device may be used as a surface level sensor. The device may be arranged to measure the (height) level of a surface.

The measuring device may be arranged to monitor the surface height level. The measuring device may be used as surface level detector. The device may be arranged to detect whether the (height) level of a surface is within a predetermined range. The device may be arranged to detect whether the (height) level of a surface is below than a predetermined lower limit. The device may be arranged to detect whether the (height) level of a surface is above than a predetermined higher limit. The device may be arranged to detect when the surface reaches a predetermined height.

BRIEF DESCRIPTION OF THE DRAWINGS

In the following examples, several versions will be described in more detail with reference to the appended drawings, in which.

DETAILED DESCRIPTION

Figure 1:
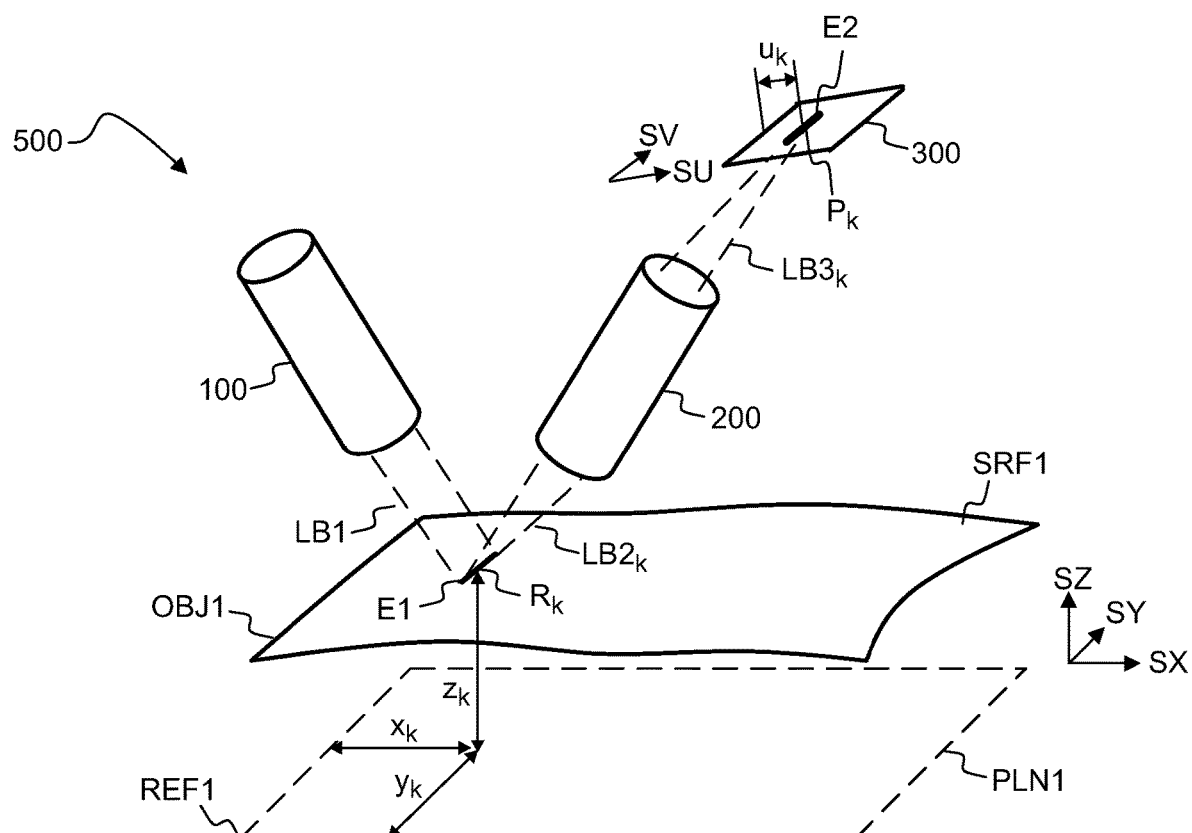
FIG. 1 shows, by way of example, in a three dimensional view, a measuring device, which is arranged to measure the height of a surface.

Referring to FIG. 1, the measuring device 500 may be arranged to measure the height $z_k$ of a surface SRF1 at one or more selected locations $(x_k, y_k)$. The height $z_k$ may be measured at one or more horizontal locations $(x_k, y_k)$. The surface SRF1 may be a surface of an object OBJ1. The surface SRF1 may be e.g. a glossy surface or a diffusing surface.

The surface SRF1 may be e.g. an interface between a first material and a gas. The surface SRF1 may be e.g. an interface between a first material and a liquid. The surface SRF1 may be e.g. an interface between a first solid material and a second substantially transparent solid material. The surface SRF1 may be e.g. an interface between a first liquid and a gas. The surface SRF1 may be e.g. an interface between a first liquid and a second substantially transparent liquid. The first material may be transparent wherein the refractive index of the first material may be different from the refractive index of the second material. The first material may be substantially non-transparent (i.e. opaque).

The measuring device 500 may comprise an illuminating unit 100, a focusing unit 200, and an image sensor 300. The illuminating unit 100 may be arranged to provide illuminating light LB1, which impinges on the surface SRF1 at a reflection point $R_k$. The illuminating unit 100 may be arranged to form an illuminated region E1 on the surface SRF1. For example, the illuminating unit 100 may be arranged to provide a substantially linear illuminated region E1.

The illuminated region E1 may reflect light $LB2_k$ towards the focusing unit 200. The focusing unit 200 may comprise focusing optics. The focusing unit 200 may be arranged to focus the reflected light to the image sensor 300. The focusing unit 200 may be arranged to form a focused spot E2 on the image sensor 300, by focusing light of a beam $LB2_k$ reflected from the illuminated region E1.

Light $LB2_k$ reflected from the illuminated region E1 may be focused on the image sensor 300 to form the focused spot E2. The light may be focused on the image sensor 300 such that the position $u_k$ of the focused spot E2 depends on the surface height $z_k$ at the selected location $(x_k,y_k)$. The position $u_k$ of the spot E2 may depend on the height $z_k$ of the surface SRF1, wherein the height $z_k$ may be determined from the detected position $u_k$ of the spot E2. The measuring device 500 may be arranged to detect the position $u_k$ of the spot E2, and the measuring device 500 may be arranged to determine the height $z_k$ of the surface SRF1 based on the detected position $u_k$ of the spot E2.

The illuminating unit 100 may be arranged to form an illuminated spot $SP1_k$ near the surface SRF1 (see FIGS. 3a-3d). Light of the illuminated spot $SP1_k$ may be reflected from the illuminated region E1 to the focusing unit 200. The focusing unit 200 may be arranged to collect and focus the light $LB2_k$ reflected from the illuminated region to the image sensor 300. The illuminated spot $SP1_k$ may be slightly above the illuminated region E1, or the illuminated spot $SP1_k$ may coincide with the illuminated region E1. The width of the illuminated region E1 of the surface SRF1 may be larger than or equal to the width of the illuminated spot $SP1_k$.

The illuminating beam LB1 may be converging beam. The surface SRF1 may reflect the light of the converging light beam LB1 by specular reflection and/or by diffuse reflection. The surface SRF1 may be glossy and/or diffusing. The glossy surface SRF1 may reflect light of illuminated spot $SP1_k$ to the focusing unit 200. Light forming the illuminated spot $SP1_k$ may be reflected by the glossy surface SRF1 before or after said light forming the illuminated spot $SP1_k$ passes through said illuminated spot $SP1_k$.

In case of the glossy surface, the focusing unit 200 may form an image E2 of the illuminated spot $SP1_k$ on the image sensor 300. Thus, the focused spot E2 formed on the image sensor 300 may be an image of the illuminated spot $SP1_k$. In case of the glossy surface SRF1, the focused spot E2 formed on the image sensor may be a substantially sharp image of the illuminated spot $SP1_k$.

The focusing unit 200 may be arranged to form an image $E2_k$ of the illuminated spot $SP1_k$ on the image sensor 300 in a situation where the surface SRF1 is glossy and the surface SRF1 is close to the illuminated spot $SP1_k$. The distance $h_k$ between the surface SRF1 and the illuminated spot $SP1_k$ may be e.g. smaller than 2 mm. The distance $h_k$ between the surface SRF1 and the illuminated spot $SP1_k$ may be e.g. smaller than 1 mm. In particular, the focusing unit 200 may form the image $E2_k$ also when the distance $h_k$ is different from zero. For example, the focusing unit 200 may form the image $E2_k$ when the distance $h_k$ has any value which is in the range of 0 to 2 mm.

In case of a diffusing surface, the measuring device 500 may form an image E2 of the illuminated region E1 on the image sensor 300. In case of the diffusing surface, the focused spot E2 formed on the image sensor 300 may be an image of the illuminated region E1.

The focusing unit 200 may be arranged to form an image $E2_k$ of the illuminated region $E1_k$ on the image sensor 300 in a situation where the surface SRF1 is diffusing and the surface SRF1 is close to the illuminated spot $SP1_k$. The distance $h_k$ between the surface SRF1 and the illuminated spot $SP1_k$ may be e.g. smaller than 2 mm. The distance $h_k$ between the surface SRF1 and the illuminated spot $SP1_k$ may be e.g. smaller than 1 mm.

The measuring device 500 may form the focused spot E2 on the image sensor 300 such that position $u_k$ of the focused spot E2 may depend on the height $z_k$ at the selected location $(x_k,y_k)$. The measuring device 500 may be arranged to determine the height $z_k$ of the surface SRF1 from the detected position $u_k$ of the spot E2.

The focused spot E2 may be a sharp image or a (slightly) blurred image. The focused spot E2 may be portion of a larger optical image IMG3 (See e.g. FIG. 7c. A portion of the larger image may be called e.g. as a sub-image. The image E2 of the illuminated region E1 may be called as the sub-image E2, and/or the image E2 of the illuminated spot $SP1_k$ may be called as the sub-image E2. The device 500 may form the sub-image E2 such that the position $u_k$ of the sub-image E2 depends on the height $z_k$ at the selected location $(x_k,y_k)$. The measuring device 500 may be arranged to determine the height $z_k$ of the surface SRF1 from the detected position $u_k$ of the sub-image E2.

The symbol $R_k$ may denote a reflection point, which substantially coincides with the illuminated region E1. In particular, the reflection point $R_k$ may be on the surface SRF1 at the center of the region E1. The height $z_k$ may denote a distance between the reflection point $R_k$ and a reference plane PLN1. SX, SY and SZ denote orthogonal directions. The coordinate $z_k$ may specify the position of the reflection point $R_k$ in the direction SZ. The reference plane PLN1 may be e.g. a substantially horizontal plane. The height $z_k$ may denote a distance between the reflection point $R_k$ and a reference plane PLN1 in a direction which is perpendicular to the reference plane PLN1. The height $z_k$ of the surface SRF1 at the selected location $(x_k,y_k)$ may also be called e.g. as the elevation of the surface SRF1. The measuring device 500 may be arranged to measure the vertical distance $z_k$ between a point $(x_k,y_k,z_k)$ of the surface and a reference plane PLN1. The vertical distance $z_k$ between the point $(x_k,y_k,z_k)$ of the surface SRF1 and the reference plane PLN1 may be called as the height $z_k$ of the surface SRF1 at said point $(x_k,y_k,z_k)$ $P_k$ may denote an image point, which substantially coincides with the focused spot E2. In particular, the image point $P_k$ may be on the surface of the image sensor 300. The image point $P_k$ may be substantially at the center of the spot E2. The focusing unit 200 may be arranged to focus light $LB2_k$ reflected from the reflection point $R_k$ to the image point $P_k$. The focusing unit 200 may be arranged to gather a part of the reflected light to the image sensor 300. The focusing unit 200 may be arranged to gather a part of light reflected from the illuminated region E1, and the focusing unit 200 may be arranged to form a sub-image E2 of the illuminated region E1 on the image sensor 300 by focusing the light gathered from the illuminated region E1. That part of the light reflected from the reflection point $R_k$ which contributes to forming the image point $P_k$ may constitute a light gathering beam $LB2_k$ of the point $P_k$. The light gathering beam $LB2_k$ may also be called as a detection beam of the point $P_k$.

The location of the reflection point $R_k$ in the directions SX and SY may be specified e.g. by coordinates $(x_k,y_k)$. The coordinate system may have a reference point REF1 and a reference plane PLN1. The reference plane PLN1 may be defined by the directions SX and SY such that the reference point REF1 is in the reference plane PLN1. The coordinate $x_k$ may indicate the location of the reflection point $R_k$ in the direction SX. The coordinate $y_k$ may indicate the location of the reflection point $R_k$ in the direction SY. The vertical position $z_k$ of the point $R_k$ may be defined by the height coordinate $z_k$ with respect to a reference plane PLN1. The vertical position $z_k$ of the point $R_k$ may indicate the (vertical) distance between the point $R_k$ and the reference plane PLN1.

Figure 2:
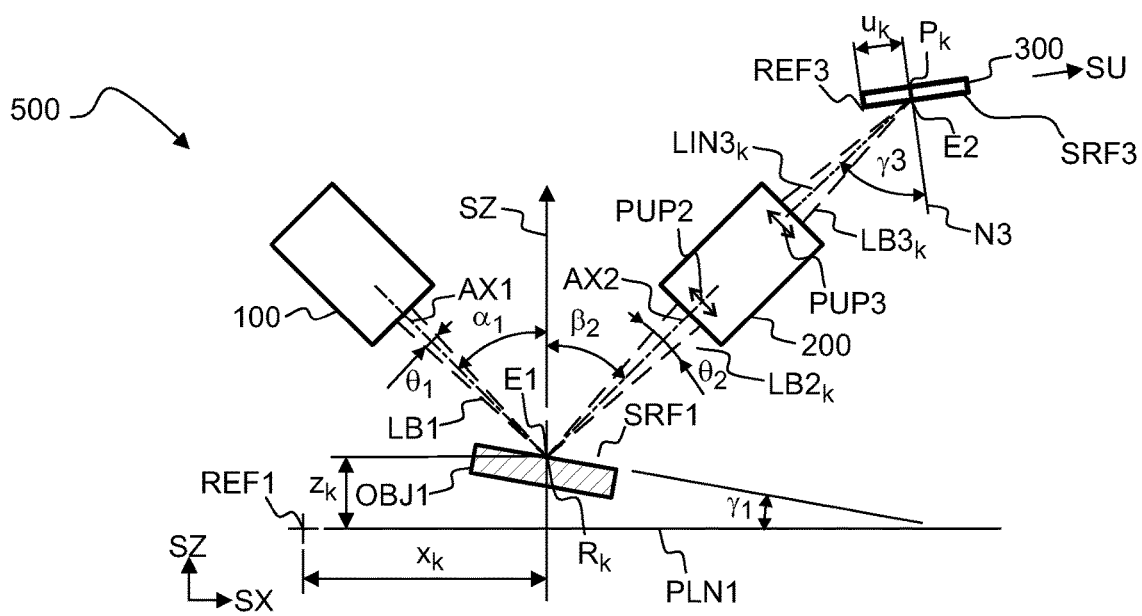
FIG. 2 shows, by way of example, in a side view, the measuring device.

Referring to FIG. 2, the illuminating unit 100 may be arranged to provide a converging light beam LB1 in order to form the illuminated region E1. The converging light beam LB1 may impinge on the surface SRF1.

The position of the reflection point $R_k$ may be defined e.g. by the coordinates $x_k$, $y_k$, and $z_k$ with respect to a reference point REF1 and with respect to the reference plane PLN1.

Light reflected from the reflection point $R_k$ may form a light gathering beam $LB2_k$ such that the light of the beam $LB2_k$ is focused to the point $P_k$ on the image sensor 300. The focusing unit 200 may provide a focused beam $LB3_k$, which impinges on the point $P_k$ on the image sensor 300. The focusing unit 200 may provide the focused beam $LB3_k$ by focusing light of the light gathering beam $LB2_k$. The focusing unit 200 may focus light of the light gathering beam $LB2_k$ to the point $P_k$ of the image sensor 300.

The device 300 may comprise:
- an illuminating unit 100 arranged to project an illuminating light beam LB1 on a surface SRF1 of a target object OBJ1 so as to form an illuminated region E1 on the surface SRF1,
- an image sensor 300, and
- focusing optics 200 arranged to form a focused spot E2 on the image sensor 300 by focusing light $LB2_k$ reflected from the illuminated region E1 such that the position $u_k$ of the spot E2 depends on the height $z_k$ of the surface SRF1,
- wherein the normal N3 of the image sensor 300 may be inclined with respect to the optical axis AX2 of the focusing optics 200.

In particular, the focusing optics 200 may be arranged to form a sub-image E2 of the illuminated region E1 on the image sensor 300 by focusing light $LB2_k$ reflected from the illuminated region E1 such that the position $u_k$ of the sub-image E2 depends on the height $z_k$ of the surface SRF1.

The illuminating light beam LB1 may have a convergence angle $\theta_1$. The light gathering beam $LB2_k$ may have a divergence angle $\theta_2$. The light gathering beam $LB2_k$ may have a divergence angle $\theta_2$. The angle $\theta_2$ may also be called as the light gathering angle of the focusing unit 200.

The focusing optics 200 may have an input pupil $PUP2_k$ and an output pupil $PUP3_k$. The light gathering beam $LB2_k$ reflected from the point $R_k$ may pass through the input pupil $PUP2_k$, and the corresponding focused beam $LB3_k$ may pass through the output pupil $PUP3_k$.

Figure 3A:
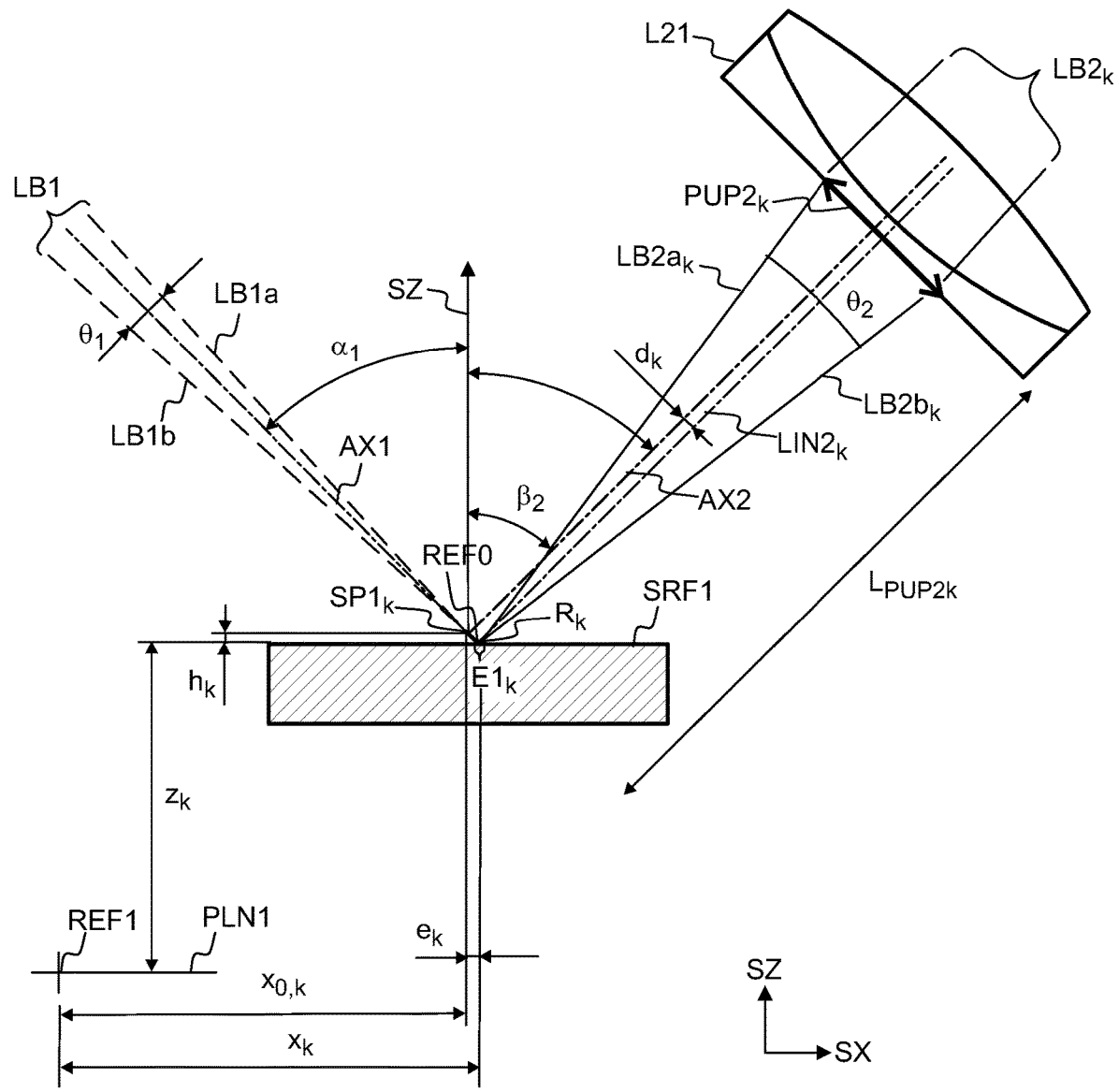
FIG. 3a shows, by way of example, in a side view, light rays of an illuminating beam, and light rays of a light gathering beam when the surface is at a first height.
Figure 3B:
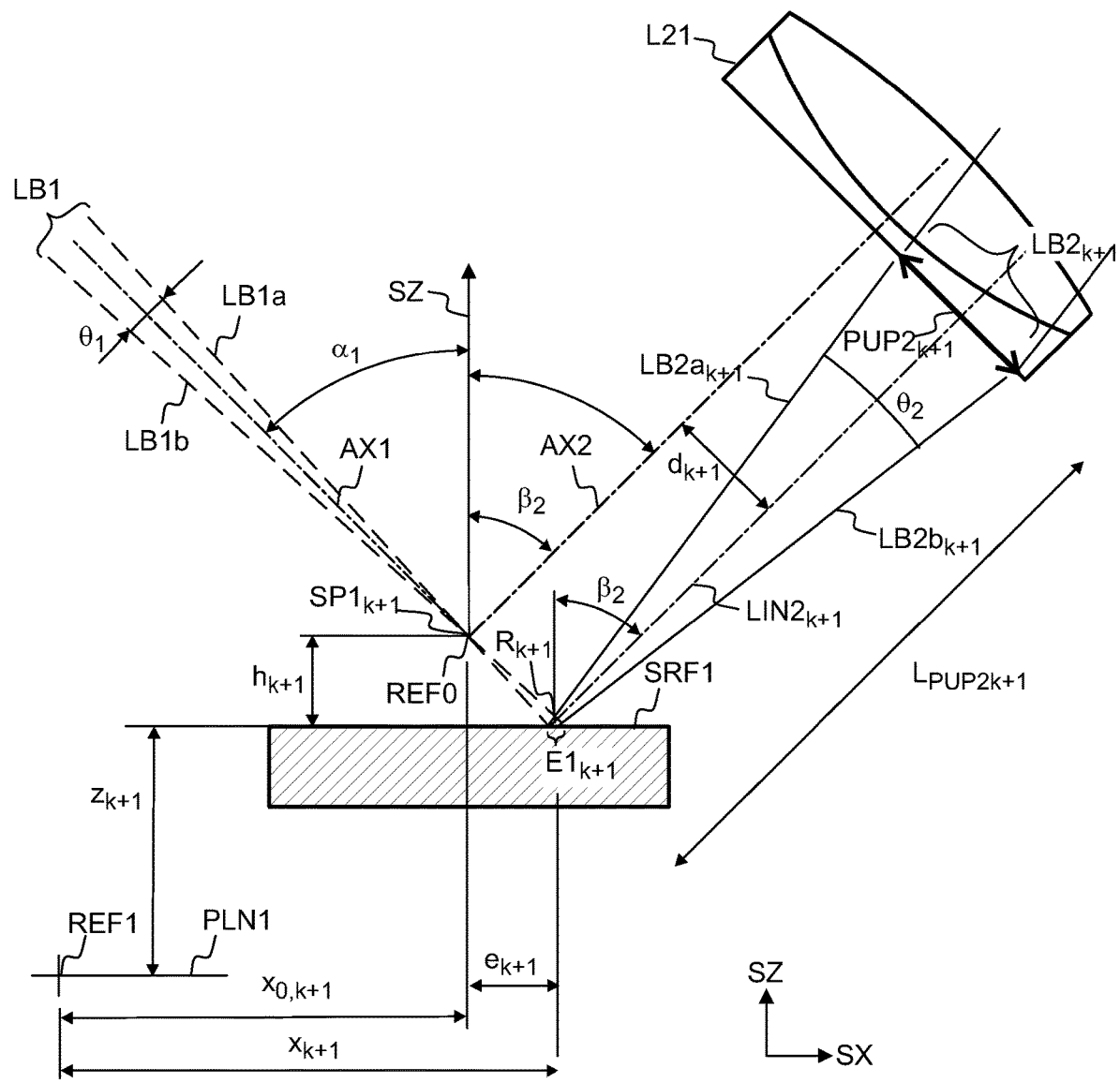
FIG. 3b shows, by way of example, in a side view, light rays of an illuminating beam, and light rays of a light gathering beam when the surface is at a second height.

The illuminating beam LB1 may have an optical axis AX1. The focusing unit may have an optical axis AX2. The optical axis AX1 of the illuminating optics 100 and the optical axis AX2 of the focusing unit 200 may define an intersection point REF0 (FIGS. 3a and 3b). The optical axis AX1 may intersect the optical axis AX2 at the intersection point REF0.

Figure 6:
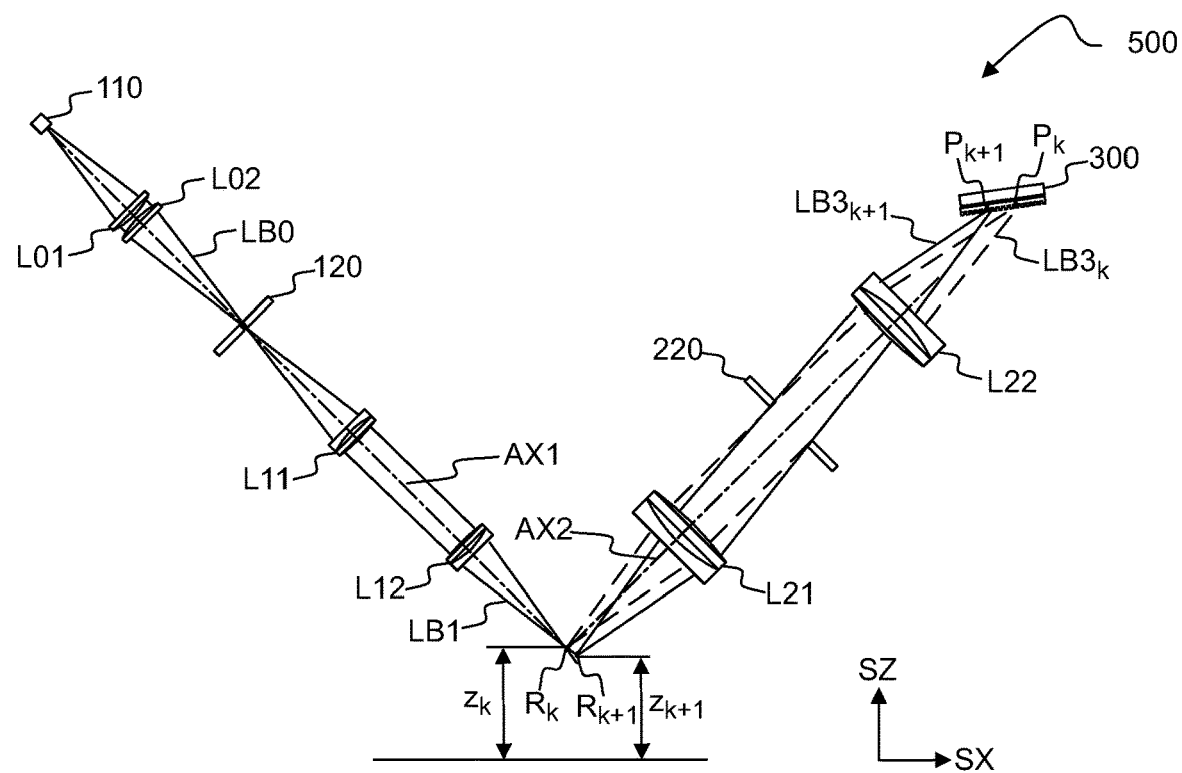
FIG. 6 shows, by way of example, in a side view, optical elements of the measuring device.

The focusing optics 200 may comprise an input lens L21 and an output lens L22 (See FIG. 6). The direction of the optical axis AX2 may be defined by the centers of the lenses L21, L22. The direction of the optical axis AX2 may be defined e.g. by the principal point of the input lens L21 of the focusing optics 200 and by the principal point of the output lens L22 of the focusing optics 200.

The focusing unit 200 may be a telecentric optical system, which may be arranged to form the focused spot E2 on the image sensor 300, by collecting light $LB2_k$ reflected from the illuminated region E1. The telecentric system may be a double telecentric optical system (See FIG. 6). The telecentric system may be afocal. The focusing unit 200 may comprise e.g. a collimating lens L21, an aperture stop 220, and a converging lens L22. The lenses L21, L22, and the aperture stop 220 may together form a double telecentric optical system.

The illuminating unit 100 and the image sensor 300 may be attached to the focusing unit 200 such that the position of the illuminating unit 100 is fixed with respect to the focusing unit 200 and such that the position of the image sensor 300 is fixed with respect to the focusing unit 200. For example, the illuminating unit 100, the focusing unit 200, and the image sensor 300 may be attached to a common frame 410 or to a common housing (see FIG. 9). The position of the intersection point REF0 may be fixed with respect to the illuminating unit 100 and the focusing unit 200. The measuring device 500 may be arranged to operate such that the position of the intersection point REF0 is independent of the height $z_k$ of the surface SRF1.

The illuminating beam LB1 may reach a minimum width at a spot $SP1_k$. The spot $SP1_k$ may be called e.g. as the waist of the beam LB1 or as the illuminated spot. The orientation of the focusing unit 200 may be selected such that the intersection point REF0 may substantially coincide with the waist $SP1_k$ of the illuminating beam LB1.

The direction of the axis AX1 of the illuminating beam LB1 may be different from the vertical direction SZ such that the position of the illuminated region E1 may depend on the height $z_k$ of the surface SRF1.

The direction of the axis AX2 of the focusing unit 200 may be different from the direction of the axis AX1 of the illuminating beam LB1 such that the position $u_k$ of the spot E2 may depend on the height $z_k$ of the surface SRF1.

$\alpha_1$ denotes the angle between the axis AX1 and the direction SZ. $\beta_2$ denotes the angle between the axis AX2 and the direction SZ. The sum of the angles $\alpha_1+\beta_2$ may be e.g. in the range of 20° to 160°.

The angles $\alpha_1$ and $\beta_2$ may also be selected such that the angle $\beta_2$ is substantially equal to the angle $\alpha_1$. The vertical direction SZ may be selected such that the direction SZ substantially bisects the angle between the axis AX1 of the illuminating beam LB1 and the axis AX2 of the focusing unit 200. The vertical direction SZ does not need to be parallel with the direction of gravity.

The illuminating light beam LB1 may have a convergence angle $\theta_1$, the focusing unit 200 may have a light gathering angle $\theta_2$.

The sum $\theta_1+\theta_2$ may be greater than or equal to e.g. 10° in order to ensure that a sufficient amount of reflected light may be gathered by the focusing unit.

The sum $\theta_1+\theta_2$ may be greater than or equal to 30° in order to ensure that a sufficient amount of reflected light may be gathered by the focusing unit.

The light gathering angle $\theta_2$ may be greater than or equal to the convergence angle $\theta_1$ in order to ensure that a sufficient amount of reflected light may be gathered by the focusing unit in a situation where the surface SRF1 is tilted. The light gathering angle $\theta_2$ may be greater than or equal to the convergence angle $\theta_1$ in order to ensure that a sufficient amount of reflected light may be gathered by the focusing unit in a situation where the surface SRF1 is tilted, wherein the tilt angle $\gamma1$ of the surface SRF1 may be e.g. in the range of −3° to +3°. The light gathering angle $\theta_2$ may be greater than or equal to the convergence angle $\theta1$ in order to ensure that a sufficient amount of reflected light may be gathered by the focusing unit in a situation where the surface SRF1 is tilted, wherein the tilt angle $\gamma1$ of the surface SRF1 may be e.g. in the range of −10° to +10°.

Using a large convergence angle $\theta_1$ may reduce the effect of variation of the tilt angle $\gamma 1$ of the surface SRF1 on the measured height of the surface SRF1. The convergence angle $\theta 1$ may be e.g. 50% to 100% of the light gathering angle ($\theta_2$). The ratio ($\theta_1/\theta_2$) of the convergence angle to the light gathering angle ($\theta_2$) may be e.g. in the range of 50% to 100%. The ratio ($\theta_1/\theta_2$) of the convergence angle to the light gathering angle ($\theta_2$) may be e.g. in the range of 50% to 90%.

The focusing unit 200 may provide a focused beam $LB3_k$ by focusing light reflected from the point $R_k$. The focused beam $LB3_k$ may have a centerline $LIN3_k$.

Figure 7A:
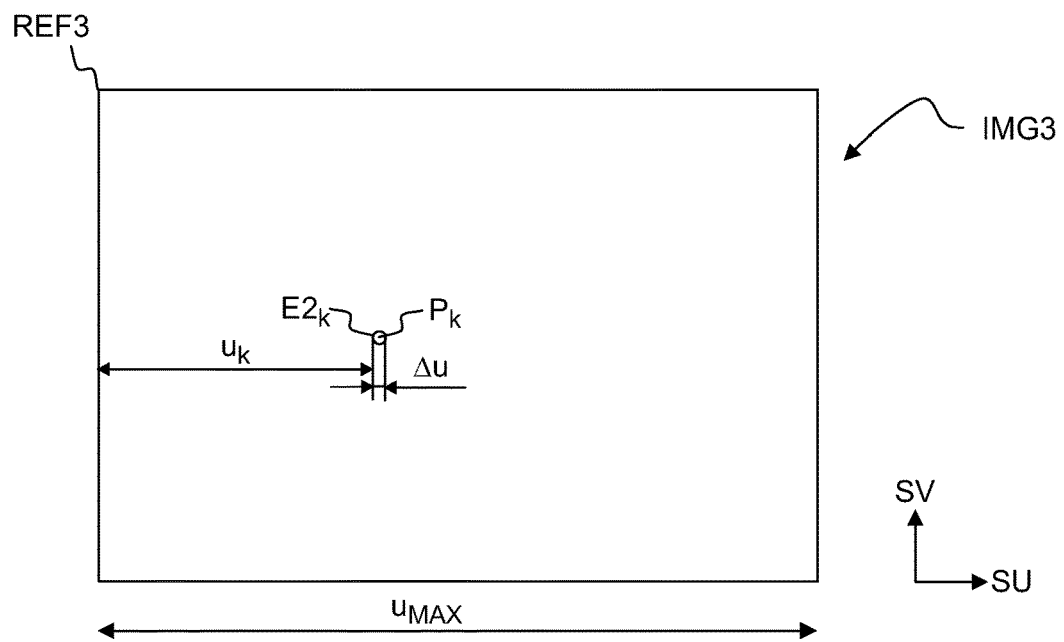
FIG. 7a shows, by way of example, an optical image formed on the image sensor.

The active area of the image sensor 300 may be parallel to a plane defined by directions SU and SV (see FIG. 7a). The position of the image point $P_k$ may be specified by a coordinate $u_k$. The coordinate $u_k$ may specify the position of the point $P_k$ with respect to a reference point REF3, in the direction SU.

The image sensor 300 may comprise a plurality of detector pixels at different positions. The image sensor 300 may comprise e.g. a one dimensional array or a two dimensional array of detector pixels. The image sensor 300 may be e.g. a CMOS detector (Complementary Metal Oxide Semiconductor device) or a CCD detector (Charge-Coupled Device).

The measurement may be carried out e.g. by using substantially monochromatic light. The measuring device 500 may be arranged to operate such that light ($LB3_k$ or $LB4_k$) focused to each detector pixel has substantially the same central wavelength and/or substantially the same spectral bandwidth.

The spectral bandwidth of the illuminating beam LB1 may be e.g. narrower than 10 nm, narrower than 1 nm, or even narrower than 0.1 nm. The illuminating unit 100 may comprise e.g. a laser light source to provide substantially monochromatic illuminating light LB1.

Referring to FIG. 3a, the illuminating beam LB1 may form the illuminated spot $SP1_k$. The illuminating beam LB1 may also impinge on the surface SRF1 at the illuminated region $E1_k$. The reflection point $R_k$ may denote the position of the illuminated region $E1_k$. The reflection point $R_k$ may denote the center of the illuminated region $E1_k$. The illuminating beam LB1 may form an illuminated region $E1_k$ at the reflection point $R_k$. The reflection point $R_k$ may have a position $(x_k, z_k)$.

The position of the illuminated spot $SP1_k$ may be different from the position of the illuminated region $E1_k$. The illuminated spot $SP1_k$ may be above the illuminated region $E1_k$ or the illuminated spot $SP1_k$ may coincide with the illuminated region $E1_k$.

The position of the reflection point $R_k$ may be different from the position of the intersection point REF0. The intersection point REF0 may be above the reflection point $R_k$ or the intersection point REF0 may coincide with the reflection point $R_k$.

The position of the illuminated spot $SP1_k$ may substantially coincide with the intersection point REF0. $h_k$ may denote a vertical distance between the intersection point REF0 and the reflection point $R_k$.

The reflection point $R_k$ may be laterally displaced by a distance $e_k$ with respect to the intersection point REF0. $e_k$ may denote a transverse distance between the intersection point REF0 and a reflection point $R_k$. $x_{0,k}$ may specify the position of the intersection point REF0 in the direction SX.

The illuminating beam LB1 may have peripheral rays LB1a, LB1b. The light gathering beam $LB2_k$ may have peripheral rays $LB2a_k$, $LB2b_k$. The focusing optics 200 may have an input lens L21. The light gathering beam $LB2_k$ may pass through an input aperture $PUP2_k$. The focusing optics 200 may be telecentric, and the diameter of the input pupil $PUP2_k$ may be smaller than the diameter of the clear portion of the input lens L21. The telecentric system may be a double telecentric optical system. The position of the input aperture $PUP2_k$ may depend on the position of the reflection point $R_k$. The distance between the center of the input aperture $PUP2_k$ and the optical axis AX2 of the focusing optics 200 may depend on the position of the reflection point $R_k$.

The gathering beam $LB2_k$ may have a central axis $LIN2_k$. The focusing unit 200 may be telecentric, and the central axis $LIN2_k$ may be substantially parallel with the optical axis AX2 of the focusing optics 200 also in a situation where the intersection point REF0 is above the reflection point $R_k$. $d_k$ may denote the distance between the central axis $LIN2_k$ and the optical axis AX2.

The divergence angle $\theta_2$ of the light gathering beam $LB2_k$ may be determined by the diameter of the input pupil $PUP2_k$ and the distance $L_{PUP2k}$ between the input pupil PUP2 and the intersection point $R_k$.

FIG. 3a shows an example where a first portion of the surface SRF1 is at a first height $z_k$.

Referring to FIG. 3b, a second portion of the surface SRF1 may be at a second different height $z_{k+1}$. The illuminating beam LB1 may impinge on the surface SRF1 at a second reflection point $R_{k+1}$. The illuminating beam LB1 may form an illuminated region $E1_{k+1}$ at the reflection point $R_{k+1}$. The reflection point $R_{k+1}$ may have a position $(x_{k+1}, z_{k+1})$. $h_{k+1}$ may denote a vertical distance between the intersection point REF0 and the reflection point $R_{k+1}$. $e_{k+1}$ may denote a transverse distance between the intersection point REF0 and a reflection point $R_{k+1}$. $x_{0,k+1}$ may specify the position of the intersection point REF0 in the direction SX.

The second light gathering beam $LB2_{k+1}$ may have peripheral rays $LB2a_{k+1}$, $LB2b_{k+1}$. The second light gathering beam $LB2_{k+1}$ may pass through a second input aperture $PUP2_{k+1}$. The distance between the center of the second input aperture $PUP2_{k+1}$ and the optical axis AX2 may be different from the distance between the center of the first input aperture $PUP2_k$ and the optical axis AX2.

The divergence angle $\theta_2$ of the light gathering beam $LB2_{k+1}$ may be determined by the diameter of the input pupil $PUP2_{k+1}$ and the distance $L_{PUP2k+1}$ between the input pupil PUP2 and the intersection point $R_{k+1}$. The gathering beam $LB2_{k+1}$ may have a central axis $LIN2_{k+1}$. The focusing unit 200 may be telecentric, and the central axis $LIN2_{k+1}$ may be substantially parallel with the optical axis AX2 of the focusing optics 200 also in a situation where the intersection point REF0 is above the reflection point $R_{k+1}$. $d_{k+1}$ may denote the distance between the central axis $LIN2_{k+1}$ and the optical axis AX2.

Figure 3C:
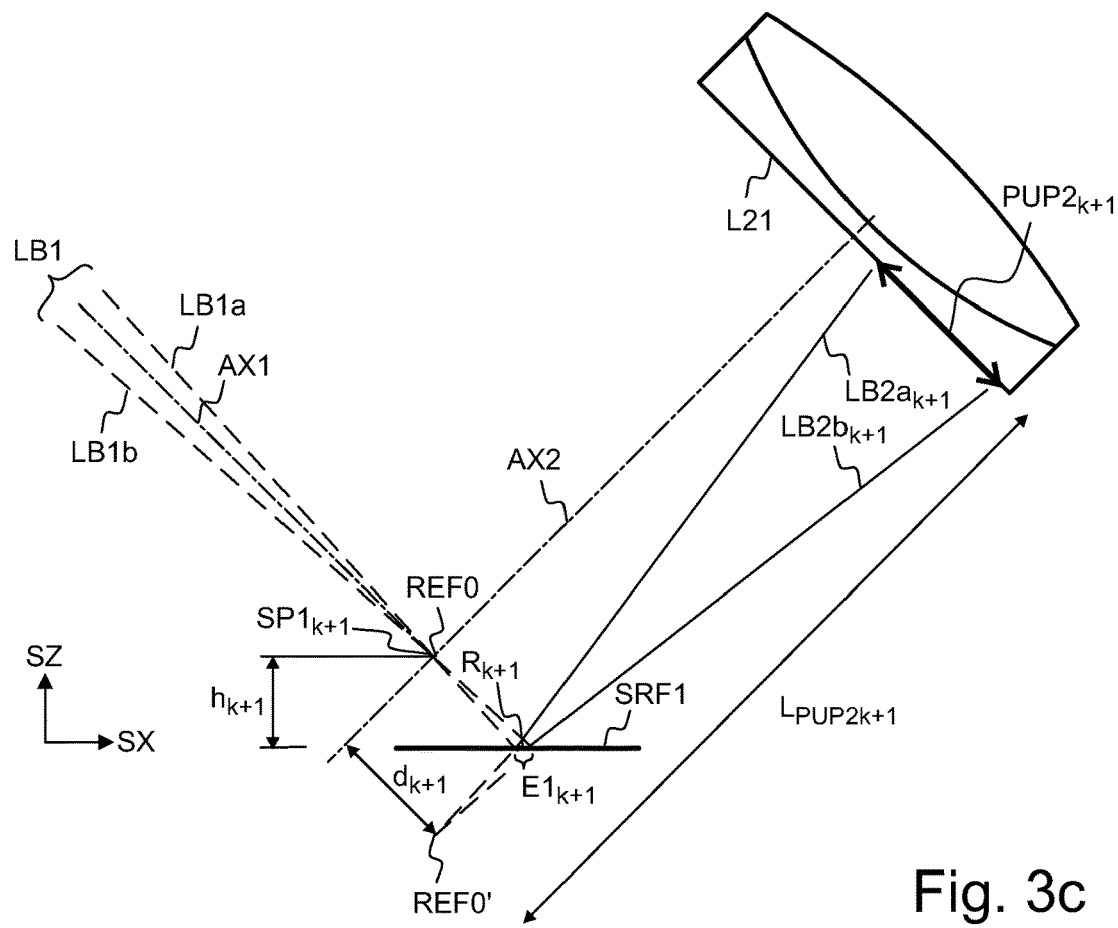
FIG. 3c shows, by way of example, in a side view, a situation where light forming the illuminated spot is reflected by the surface after the light has passed through the illuminated spot.
Figure 3D:
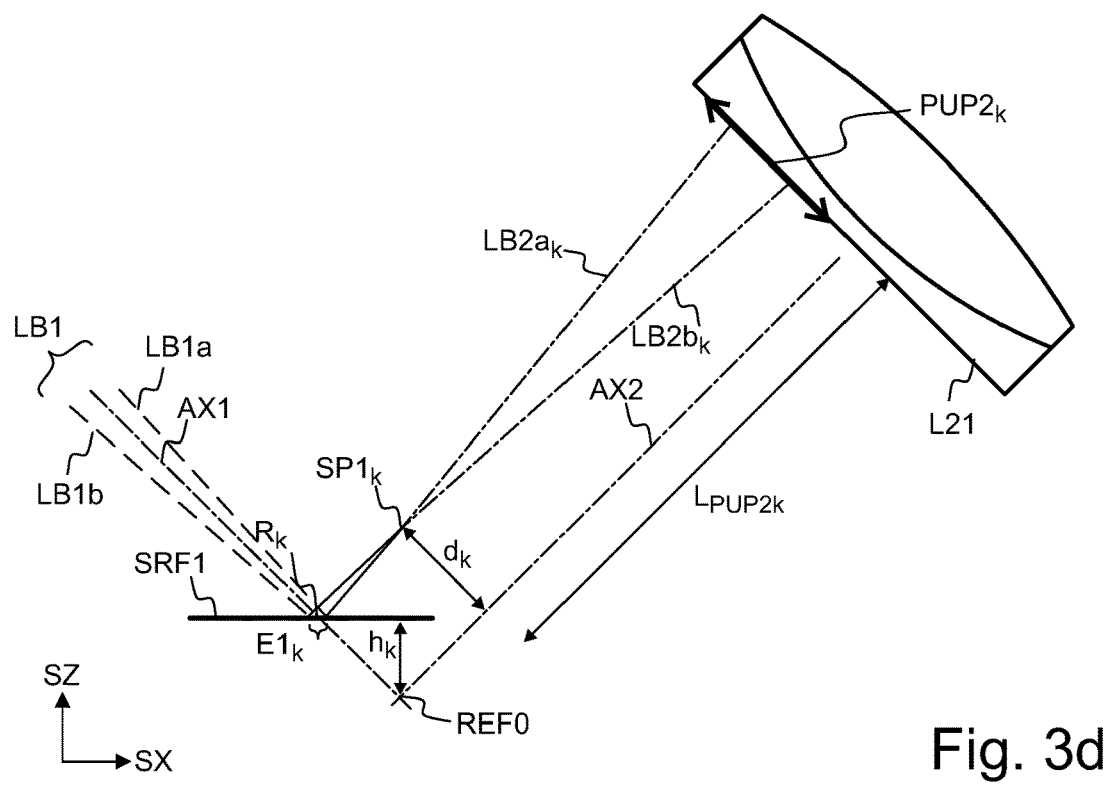
FIG. 3d shows, by way of example, in a side view, a situation where light forming the illuminated spot is reflected by the surface before the light has passed through the illuminated spot.

Referring to FIGS. 3c and 3d, the light forming the illuminated spot $SP1_k$ may be reflected by the glossy surface SRF1 before or after the light forming the illuminated spot $SP1_k$ passes through the illuminated spot $SP1_k$. REF0' denotes the mirror image of the intersection point REF0 with respect to the surface SRF1. In case of FIG. 3d, the intersection point REF0 is below the surface SRF1.

Referring to FIG. 3c, the light of the beam LB1 may form the illuminated spot $SP1_k$ before the light of the beam LB1 is reflected from the illuminated region $E1_k$. The light of the illuminating beam LB1 may impinge on the surface SRF1 after passing through the illuminated spot $SP1_k$. The light forming the illuminated spot $SP1_k$ may be reflected by the glossy surface SRF1 after said light forming the illuminated spot $SP1_k$ passes through said illuminated spot $SP1_k$.

Referring to FIG. 3d, the light of the illuminating beam LB1 may impinge on the surface SRF1 before passing through the illuminated spot $SP1_k$. The light of the illuminating beam LB1 may be reflected from the illuminated region $E1_k$ before the light reflected by the illuminated region $E1_k$ forms the illuminated spot $SP1_k$. The light forming the illuminated spot $SP1_k$ may be reflected by the glossy surface SRF1 before the light forming the illuminated spot $SP1_k$ has passed through the illuminated spot $SP1_k$.

Figure 4A:
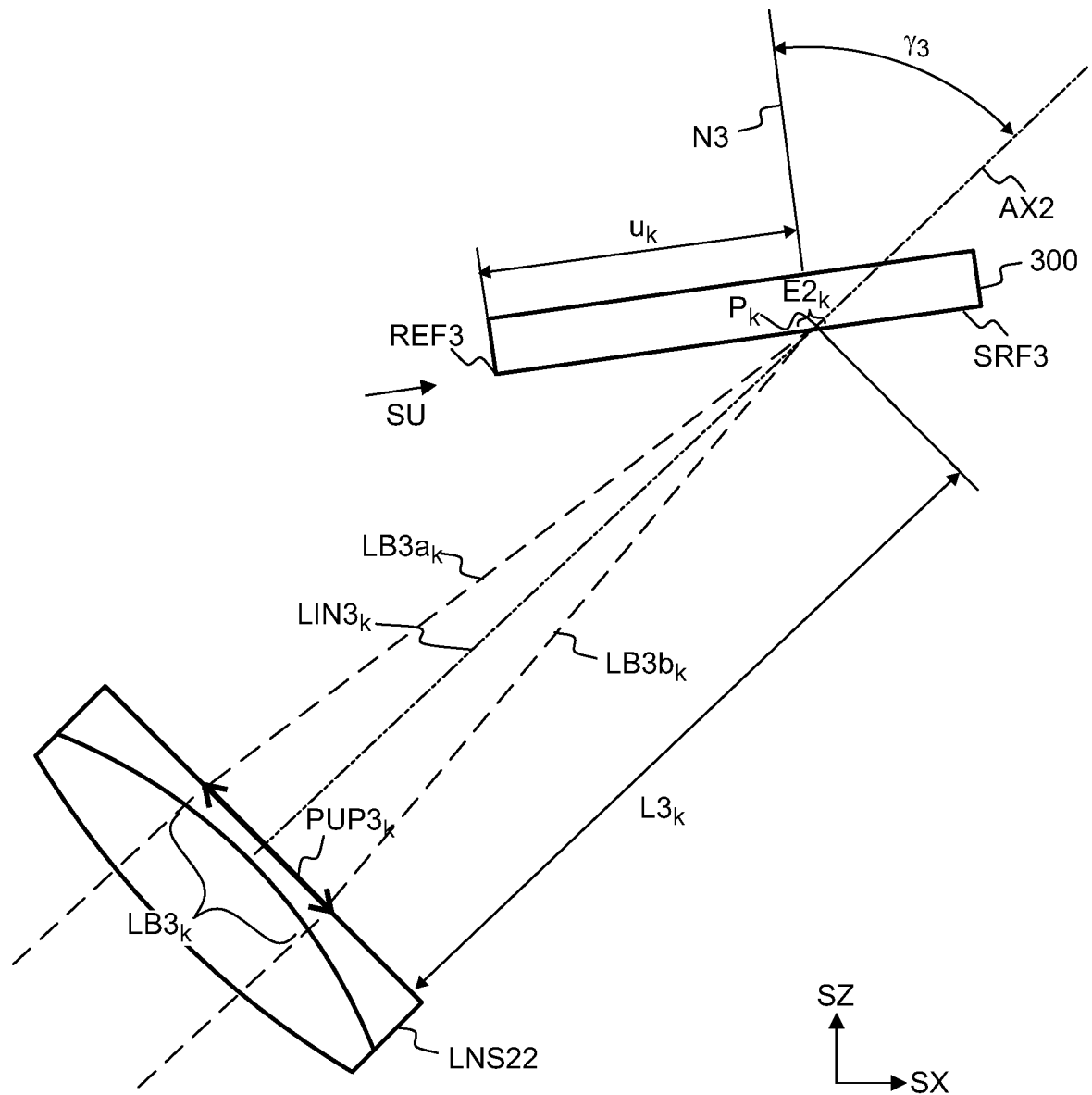
FIG. 4a shows, by way of example, in a side view, light rays of a focused beam impinging on the surface of an image sensor when the surface is at a first height.

Referring to FIG. 4a, the focusing optics 200 may form a focused beam $LB3_k$ by focusing light of the gathering beam $LB2_k$. For example, the focusing optics 200 may form a focused beam $LB3_k$ by focusing light of the gathering beam $LB2_k$ shown in FIG. 3a. The focused beam $LB3_k$ may impinge on the active surface SRF3 of the image sensor 300 at an image point $P_k$. The focusing optics 200 may form a focused spot $E2_k$ on the image sensor 300 by focusing light reflected from the illuminated region $E1_k$. In case of glossy surface SRF1, the focusing optics 200 may form the focused spot $E2_k$ such that the focused spot $E2_k$ is an image of the illuminated spot $SP1_k$. In case of diffusing surface SRF1, the focusing optics 200 may form the focused spot $E2_k$ such that the focused spot $E2_k$ is an image of the illuminated region $E1_k$.

The center of the spot $E2_k$ may be at the point $P_k$. The position of the image point $P_k$ may be defined by a coordinate $u_k$ with respect to a reference point REF3. The image plane of the image sensor 300 may be defined by directions SU and SV (FIG. 7a).

The focused beam $LB3_k$ may have peripheral rays $LB3a_k$, $LB3b_k$. The focused beam $LB3_k$ may have a central axis $LIN3_k$. The central axis $LIN3_k$ may be substantially parallel with the optical axis AX2 of the focusing optics 200.

The focusing optics 200 may have an output lens L22. The focused beam $LB3_k$ may pass through an output pupil $PUP3_k$. The focusing optics 200 may be telecentric, and the diameter of the output pupil $PUP3_k$ may be smaller than the diameter of the clear portion of the output lens L22. The position of the output pupil $PUP3_k$ may depend on the position of the reflection point $R_k$.

The active light-detecting area SRF3 of the image sensor 300 may be inclined so that the spot E2 formed on the image sensor 300 may remain substantially sharp in a situation where the height $z_k$ of the surface SRF1 is changed. The image sensor 300 may be inclined with respect to the axis AX2 so as to reduce or minimize blurring of spots $E2_k$, $E2_{k+1}$, which correspond to different vertical positions $z_k$, $z_{k+1}$ of the surface SRF1. The image sensor 300 may be inclined with respect to the axis AX2 so as to keep the width of the first spot $E2_k$ in the direction SU smaller than a predetermined limit, and also to keep the width of the second spot $E2_{k+1}$ in the direction SU smaller than the predetermined limit.

The active light-detecting area SRF3 of the image sensor 300 may have a surface normal N3, i.e. the normal N3 is perpendicular to the surface SRF3. The orientation of the image sensor 300 may be specified e.g. by an orientation angle γ3. The orientation angle γ3 may denote the angle between the surface normal N3 and the optical axis AX2 of the focusing optics 200.

Figure 4B:
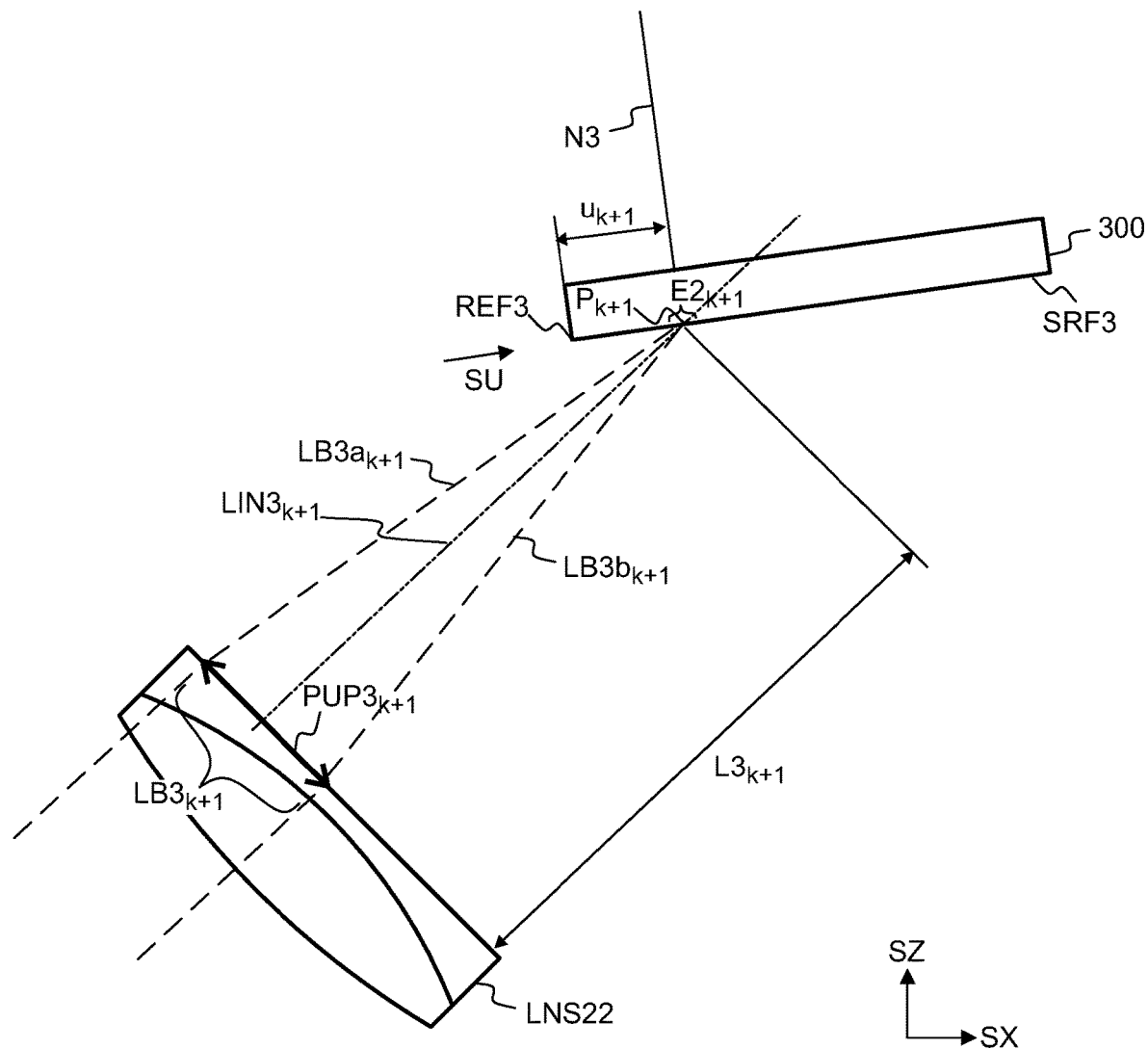
FIG. 4b shows, by way of example, in a side view, light rays of a focused beam impinging on the surface of the image sensor when the surface is at a second height.

Referring to FIG. 4b, the focusing optics 200 may form a focused beam $LB3_{k+1}$ by focusing light of the gathering beam $LB2_{k+1}$. For example, the focusing optics 200 may form the focused beam $LB3_{k+1}$ by focusing light of the gathering beam $LB2_{k+1}$ shown in FIG. 3b.

The focused beam $LB3_{k+1}$ may impinge on the active surface SRF3 of the image sensor 300 at an image point $P_{k+1}$. The focusing optics 200 may form a focused spot $E2_{k+1}$ on the image sensor 300 by focusing light reflected from the illuminated region $E1_{k+1}$.

In case of glossy surface SRF1, the focusing optics 200 may form the focused spot $E2_{k+1}$ such that the focused spot $E2_{k+1}$ is an image of the illuminated spot $SP1_{k+1}$. In case of diffusing surface SRF1, the focusing optics 200 may form the focused spot $E2_{k+1}$ such that the focused spot $E2_{k+1}$ is an image of the illuminated region $E1_{k+1}$.

The focusing optics 200 may form the spot $E2_{k+1}$ such that the center of the image $E2_{k+1}$ is at the point $P_{k+1}$.

The focused beam $LB3_{k+1}$ may have peripheral rays $LB3a_{k+1}$, $LB3b_{k+1}$. The focused beam $LB3_{k+1}$ may have a central axis $LIN3_{k+1}$. The central axis $LIN3_{k+1}$ may be substantially parallel with the optical axis AX2 of the focusing optics 200.

The focused beam $LB3_{k+1}$ may pass through an output pupil $PUP3_{k+1}$. The focusing optics 200 may be telecentric, and the diameter of the output pupil $PUP3_k$ may be smaller than the diameter of the clear portion of the output lens L22. The position of the second output pupil $PUP3_{k+1}$ may be different than the position of the first output pupil $PUP3_k$ shown in FIG. 4a.

$L3_k$ may denote the distance between the principal point of the output lens L22 and the waist of the focused beam $LB3_k$. $L3_{k+1}$ may denote the distance between the principal point of output lens L22 and the waist of the focused beam $LB3_{k+1}$. The waist may mean the narrowest point of the beam. The distance $L3_k$ may depend on the height $z_k$ of the reflecting surface SRF1. The distance $L3_{k+1}$ may be different from the distance $L3_k$. The distances $L3_k$, $L3_{k+1}$ may be measured in the direction of the optical axis AX2. The measuring device 500 may operate such that the waist of the first focused beam $LB3_k$ may coincide with the active area SRF3 of the sensor 300, and such that the waist of the second focused beam $LB3_{k+1}$ may substantially coincide with the active area SRF3 of the sensor 300. The active light-detecting area SRF3 of the image sensor 300 may be inclined such that the waist of the first focused beam $LB3_k$ may coincide with the active area SRF3 of the sensor 300, and such that the waist of the second focused beam $LB3_{k+1}$ may substantially coincide with the active area SRF3 of the sensor 300. The measuring device 500 may be arranged to operate such that the spots $E_k$, $E_{k+1}$ corresponding to different heights $z_k$, $z_{k+1}$ may be substantially sharp.

The light-detecting area SRF3 of the image sensor 300 may be inclined so that so that a substantially sharp focused image E2 may be formed when the illuminated region E1 is at a first height $z_k$, and also when the illuminated region E1 is at a second different height $z_{k+1}$. A first spot $E2_k$ may be formed at a position $u_k$ when the illuminated region E1 is at a first height $z_k$, and a second spot $E2_{k+1}$ may be formed at a position $u_{k+1}$ when the illuminated region E1 is at a second height $z_{k+1}$. The heights $z_k$ and $z_{k+1}$ may be selected such that $E2_k$ represents the sharpest possible image, and such that the distance $u_{k+1} - u_k$ between the transverse positions $u_{k+1}$ and $u_k$ is e.g. equal to 25% of the total width $u_{max}$ of the active area SRF3 of the image sensor 300. The orientation angle γ3 of the normal N3 of the image sensor 300 with respect to the axis AX2 of the focusing unit 200 may be selected such that the difference between the width of second spot $E2_{k+1}$ and the width of the first spot $E2_k$ is smaller than 50% of the width of the first spot $E2_k$. The widths of the spots $E2_k$, $E2_{k+1}$ may be measured in the direction SU.

Figure 5A:
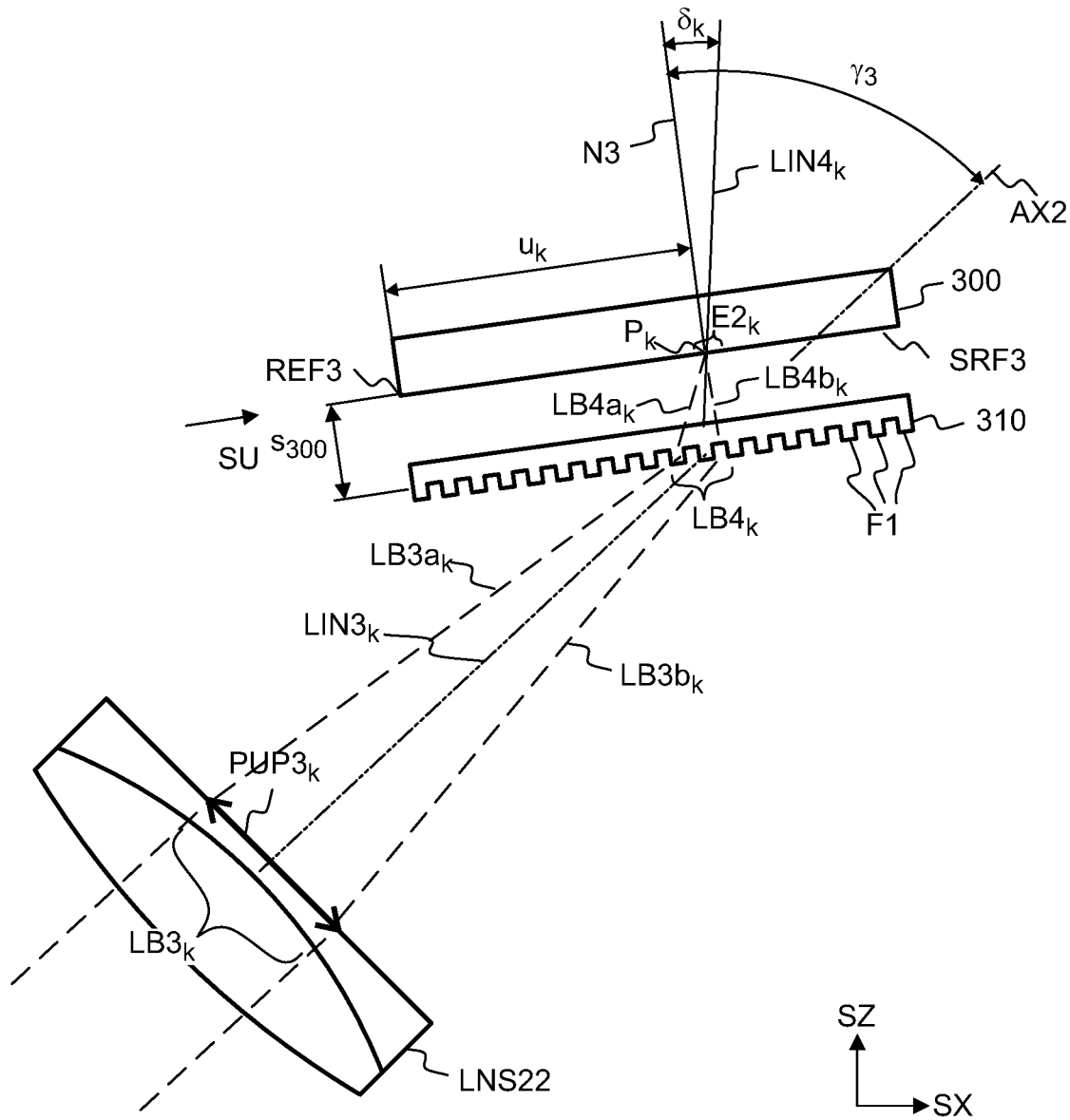
FIG. 5a shows, by way of example, in a side view, light rays of a focused beam impinging on the surface of an image sensor when the surface is at the first height.
Figure 5B:
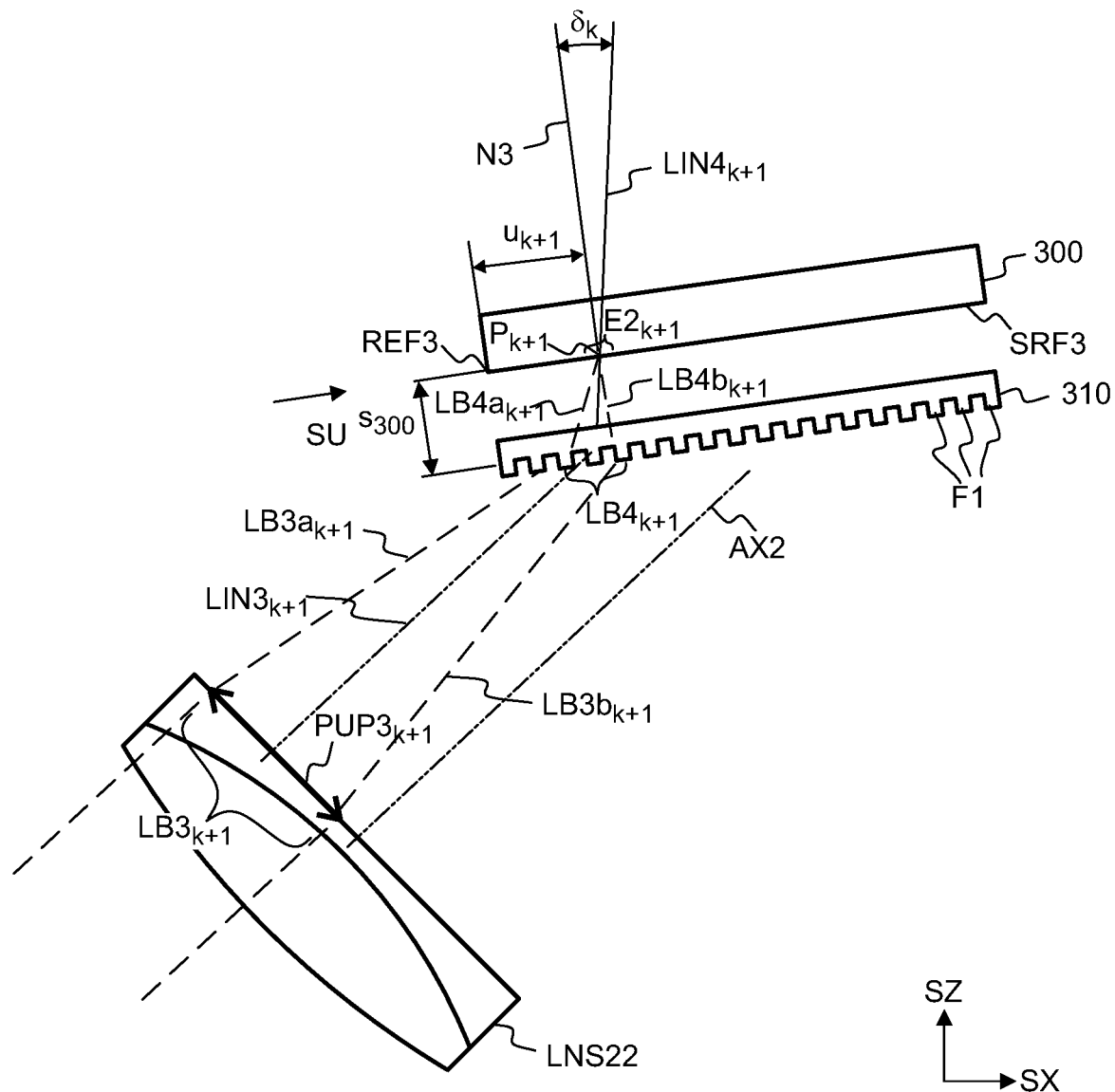
FIG. 5b shows, by way of example, in a side view, light rays of a focused beam impinging on the surface of the image sensor when the surface is at the second height.

Referring to FIGS. 5a and 5b, the image sensor 300 may be tilted in order to keep the spot E2 substantially focused at the different positions, and the measuring device 500 may comprise a beam deflecting element 310 for increasing the efficiency of the image sensor 300. The quantum efficiency of the image sensor 300 for photons which impinge on the active surface SRF3 at an oblique angle may be substantially lower than the quantum efficiency for photons, which impinge on the active surface SRF3 in the direction of the normal N3 of the active area SRF3. The measuring device 500 may optionally comprise a beam deflecting element 310 for increasing the quantum efficiency of the image sensor 300.

The deflecting element 310 may be arranged to receive a focused beam $LB3_k$ from the focusing unit 200, and to provide a deflected beam $LB4_k$ to the image sensor 300 by deflecting light of the focused light beam $LB3_k$. The beam deflecting element 310 may deflect light of the focused beam $LB3_k$ towards the image sensor 300. The beam deflecting element 310 may be arranged to provide a deflected beam $LB4_k$, which impinges on the point $P_k$ on the active area SRF3 of the image sensor 300. The beam deflecting element 310 may be arranged to provide the deflected beam $LB4_k$ from the light of the focused beam $LB3_k$. The beam deflecting element 310 may form a focal spot $E2_k$ on the active area SRF3 by deflecting the focused light such that the center of the image $E2_k$ may be at the point $P_k$.

The beam deflecting element 310 may be arranged to provide the deflected beam $LB4_k$ e.g. by diffracting light of the focused beam $LB3_k$. The beam deflecting element 310 may be e.g. a diffraction grating. The beam deflecting element 310 may comprise a plurality of diffractive features F1. The diffractive features F1 may be e.g. diffractive ridges or grooves.

The beam deflecting element 310 may also comprise e.g. a plurality of refractive facets to provide the deflected beam $LB4_k$. The beam deflecting element 310 may comprise e.g. a plurality of substantially parallel Fresnel prisms, which may provide the deflected beam $LB4_k$ by refracting light of the focused beam $LB3_k$.

The beam deflecting element 310 may be arranged to provide a deflected peripheral ray $LB4a_k$ from light of the peripheral ray $LB3a_k$. The beam deflecting element 310 may be arranged to provide a deflected peripheral ray $LB4b_k$ from light of the peripheral ray $LB3b_k$. $LIN4_k$ may denote the centerline of the deflected beam $LB4_k$. $\delta_k$ may denote an angle between the centerline $LIN4_k$ and the normal N3 of the active area SRF3. For example, the beam deflecting element 310 may be arranged to provide the deflected beam $LB4_k$ such that the angle $\delta_k$ is smaller than 80% of the angle $\gamma 3$.

$s_{300}$ may denote the distance between the beam deflecting element 310 and the active area SRF3. The distance $s_{300}$ may be relatively small in order to provide a substantially sharp spot E2 at each position. For example, the distance $s_{300}$ may be smaller than 10% of the focal length of the focusing optics 200. The distance $s_{300}$ may even be smaller than 1% of the focal length of the focusing optics 200.

Referring to FIG. 5b, the focusing unit 200 may be arranged to focus light reflected from a second reflection point $R_{k+1}$ to a second point $P_{k+1}$ on the surface SRF3 of the image sensor 300. The focusing unit 200 may provide a focused beam $LB3_{k+1}$, which has peripheral rays $LB3a_{k+1}$, $LB3b_{k+1}$. The deflecting element 310 may provide a deflected beam $LB4_{k+1}$ by deflecting light of the focused beam $LB3_{k+1}$. The deflecting element 310 may provide deflected rays $LB4a_{k+1}$, $LB4b_{k+1}$ by deflecting light of the rays $LB3a_{k+1}$, $LB3b_{k+1}$. The beam $LB4_{k+1}$ may have a centerline $LIN4_{k+1}$.

The image sensor 300 may be inclined with respect to an optical axis AX2 of the focusing unit 200.

Referring to FIG. 6, the tilt angle $\gamma 3$ of the image sensor 300 may be selected such that the focusing unit 200 provides a first focused spot $E2_k$ at an image point $P_k$ on the image sensor 300 and a second focused spot $E2_{k+1}$ at an image point $P_{k+1}$ on the image sensor 300, wherein the first image point $P_k$ corresponds to a first reflection point $R_k$ which is at a first height $z_k$, and the second image point $P_{k+1}$ corresponds to a second reflection point $R_{k+1}$ which is at a second different height $z_k$. The tilt angle of the image sensor 300 may be e.g. the angle between the normal N3 of the image sensor 300 and the optical axis AX2 of the focusing unit 200. The tilt angle $\gamma 3$ between the normal N3 of the image sensor 300 and the optical axis AX2 of the focusing unit 200 may be e.g. in the range of 10° to 80°. The tilt angle $\gamma 3$ between the normal N3 of the image sensor 300 and the optical axis AX2 of the focusing unit 200 may be e.g. in the range of 20° to 80°.

The illuminating unit 100 may comprise an illuminated aperture 120, and the illuminating unit 100 may be arranged to form the illuminated region E1 by focusing light B0 transmitted through the illuminated aperture. In particular, the illuminated aperture may be an illuminated slit 120. The illuminating unit 100 may comprise an illuminated slit 120, and projection optics L11, L12, wherein the projection optics L11, L12 may be arranged to provide the illuminating beam LB1 by focusing light LB0 transmitted through the illuminated slit 120.

The focusing optics 200 may be telecentric. The focusing optics 200 may comprise an input lens L21, and output lens L22, and an aperture element 220 positioned between the lenses L21, L22. The aperture of the aperture stop 220 may define e.g. the diameter of the input pupil $PUP2_k$ and the output pupil $PUP3_k$. The distance between the input lens L21 and the aperture of the aperture stop 220 may be e.g. substantially equal to the focal length of the input lens L21. The distance between the aperture of the aperture stop 220 and the output lens L22 may be e.g. substantially equal to the focal length of the output lens L22. The input lens L21 may also be called e.g. as a collimating lens, and the output lens L21 may also be called e.g. as a focusing lens.

The illuminating unit 100 may comprise a light source 110. The light source 110 may comprise e.g. a laser or a light emitting diode. Light emitted from the light source 110 may be concentrated to a slit 120 e.g. by one or more lenses L01, L02. The measuring device 500 may comprise a telecentric light engine, which may be arranged to illuminate the slit 120. The telecentric light engine may comprise the light source 110 and the lenses L01, L02. Light transmitted through the slit 120 may be focused e.g. by relay optics in order to provide the illuminating beam LB1. The relay optics may comprise e.g. one or more lenses L11, L12. The focusing unit 200 may comprise one or more lenses L21, L22 to focus reflected light to the image sensor 300. The focused light beam may be optionally deflected by the element 310.

The illuminated aperture 120 may also be implemented by using a solid state light emitter. The illuminating unit 100 may comprise e.g. a semiconductor laser, which may have a substantially rectangular light-emitting aperture. Light emitted from the light-emitting aperture may be focused by the lens system L11, L12 in order to provide the illuminating beam LB1, and in order to provide a substantially linear illuminated region E1.

The illuminating unit 100 may comprise a plurality of semiconductor lasers to form an illuminated dot pattern or a stripe pattern on the surface SRF1. The illuminating unit 100 may comprise an array of semiconductor lasers to form an illuminated dot pattern or a stripe pattern on the surface SRF1.

The illuminating unit 100 may comprise a substantially monochromatic light source 110 and a holographic optical element to provide the illuminating beam LB1.

FIG. 7a shows, by way of example, an optical image IMG3 formed on the image sensor 300. In this example, the illuminated spot $SP1_k$ and/or the illuminated region $E1_k$ may be e.g. a dot. The focused spot $E2_k$ formed on the image sensor 300 may be an image of the illuminated spot $SP1_k$ and/or an image of the illuminated region $E1_k$. The shape of the focused spot $E2_k$ may correspond to the shape of the illuminated spot $SP1_k$ and/or the illuminated region $E1_k$. Thus, the spot $E2_k$ formed on the image sensor 300 may also be a dot. The spot $E2_k$ may represent a small part of the whole optical image IMG3. The optical image IMG3 may be formed on an image area defined by directions SU and SV. In an embodiment, the direction SV may be substantially parallel to the direction SY.

The position of the spot $E2_k$ may substantially coincide with the image point $P_k$. The image point $P_k$ may be located e.g. at the center of the spot $E2_k$. The position of the spot E2 may be specified e.g. by coordinates $u_k$, $v_k$ with respect to a reference point REF3. The height $z_k$ of the reflection point Rk may be determined from the measured coordinate $u_k$ of the spot E2. The spot $E2_k$ may have a width $\Delta u$ in the direction SU. The reference point REF3 may be e.g. at a corner of the optical image IMG3, or at the center of the optical image IMG3. The reference point REF3 may be e.g. at a corner of the active surface SRF3 of the image sensor 300, or at the center of the active surface SRF3. The $u_{MAX}$ may denote the width of the active light-detecting area SRF3 of the image sensor 300 in the direction SU.

In an embodiment, the width $u_{MAX}$ of the active area SRF3 may correspond to a change of height, which is substantially equal to 3.0 mm. A first spot E2 formed at a first side of the active area SRF3 may correspond to a surface height −1.5 mm, a second spot formed at the center of the active area SRF3 may correspond to a surface height 0.0 mm, and a third spot formed at the second side of the active area SRF3 may correspond to a surface height +1.5 mm. The width $\Delta u$ of the spot E2 may be e.g. 3% of the width $u_{MAX}$. For example, the width $\Delta u$ of the spot E2 may approximately correspond to a height resolution of 0.1 mm.

Figure 7B:
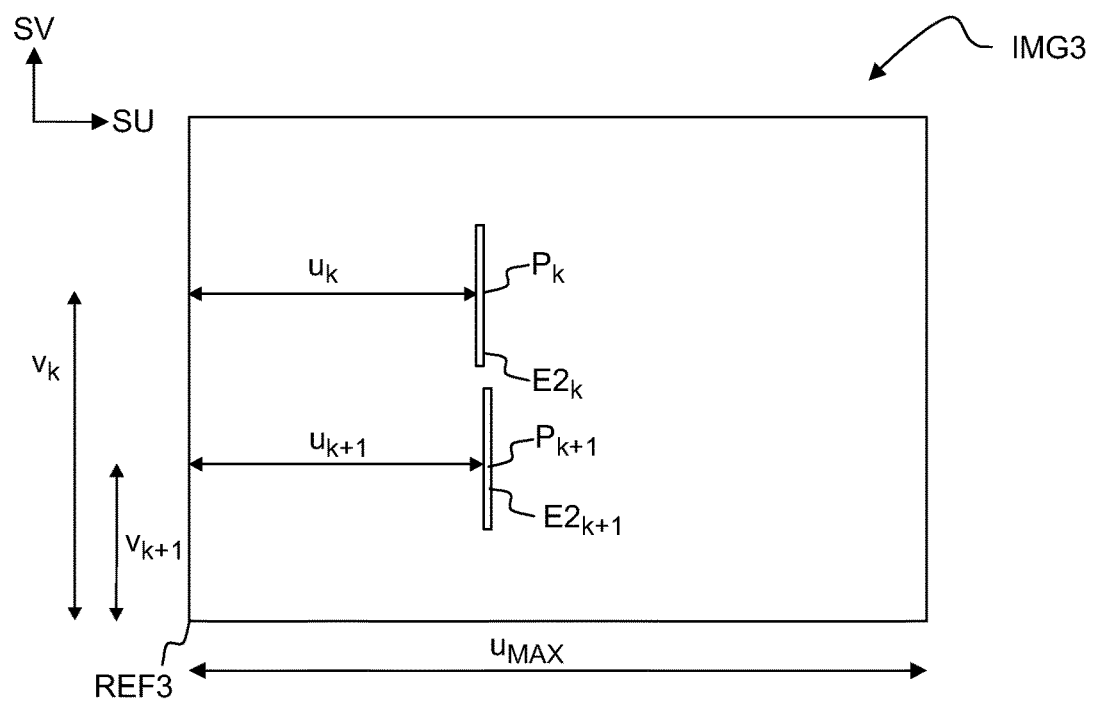
FIG. 7b shows, by way of example, an optical image formed on the image sensor.

Referring to FIG. 7b, the shape of the illuminated spot $SP1_k$ and/or the shape of the illuminated region E1 may be substantially linear. The focusing optics 200 may form a substantially linear spot E2 on the image sensor 300.

In case of the linear illuminated spot SP1 or region E1, the position of the linear spot E2 formed on the image sensor 300 may be measured with a higher accuracy than the position of a circular dot.

The illuminating unit 100 may be arranged to form several illuminated regions $E1_k$, $E1_{k+1}$ on the surface SRF1 e.g. in order to measure the height at several different locations substantially simultaneously. The focusing unit 200 may be arranged to form a first linear spot $E2_k$ by focusing light reflected from a first illuminated region $E1_k$.

The focusing unit 200 may be arranged to form a second linear spot $E2_{k+1}$ by focusing light reflected from a second illuminated region $E1_{k+1}$.

For example, a first focused spot $E2_k$ may be an image of a first illuminated spot $SP1_k$, which has been reflected by a first illuminated region $E1_k$. The first illuminated region $E1_k$ may be at a height $z_k$, and the first focused spot $E2_k$ may have a position $u_k$ on the image sensor 300. A second focused spot $E2_{k+1}$ may be an image of a second illuminated spot $SP1_{k+1}$, which has been reflected by a second illuminated region $E1_{k+1}$. The second illuminated region $E1_{k+1}$ may be at a different height $z_{k+1}$, and the second focused spot $E2_{k+1}$ may have a position $u_{k+1}$ on the image sensor 300. The position of the first spot $E2_k$ may be specified by coordinates $u_k$, $v_k$. The position of the second spot $E2_{k+1}$ may be specified by coordinates $u_{k+1}$, $v_{k+1}$. The height of the surface SRF1 at a first location $x_k$ may be determined from the detected coordinate $u_k$. The height of the surface SRF1 at a second location $x_{k+1}$ may be determined from the detected coordinate $u_{k+1}$. The coordinates $v_{k+1}$, $v_{k+2}$ may correspond to different transverse locations on the surface SRF1.

Figure 7C:
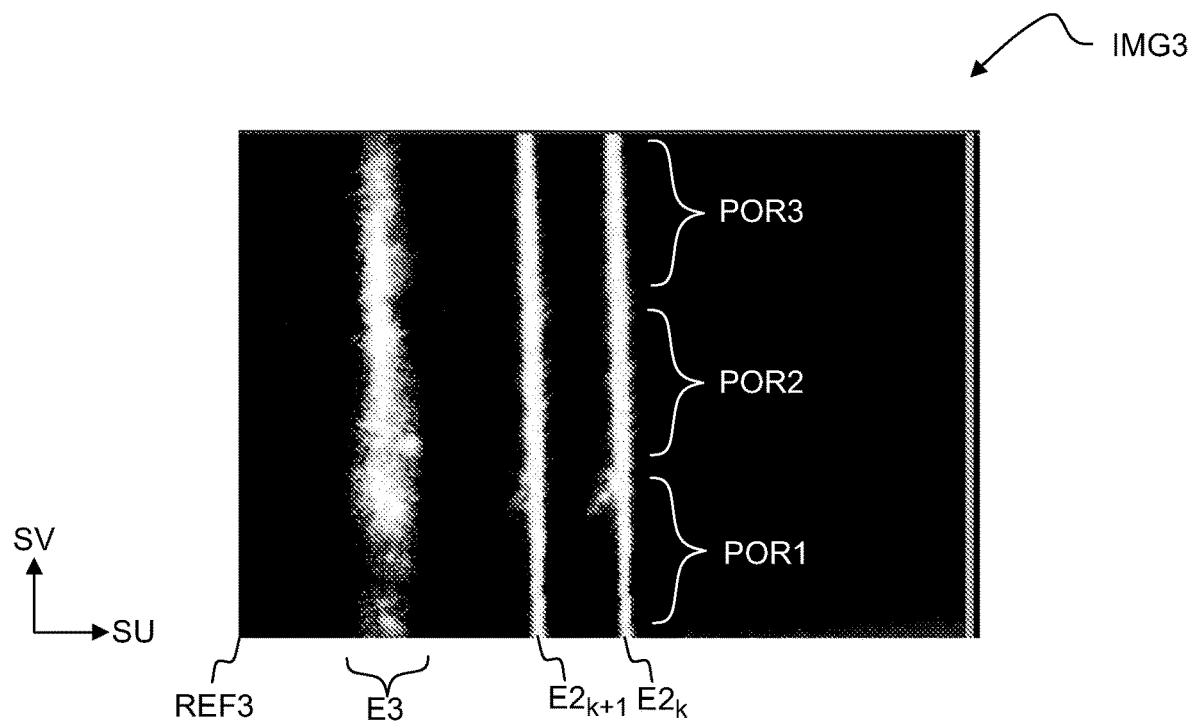
FIG. 7c shows, by way of example, an optical image formed on the image sensor.

FIG. 7c shows, by way of example, an optical image IMG3 formed on the image sensor 300 in an experimental situation where the target object OBJ1 comprises a transparent plastic foil, which has been attached to a substrate by two-sided adhesive tape. The adhesive tape is between the foil and the substrate. The optical image IMG3 comprises focused spots $E2_k$, $E2_{k+1}$, and E3. The spot $E2_k$ is formed from light reflected from the upper surface SRF1 of the foil. The spot $E2_{k+1}$ is formed from light reflected from the lower surface of the foil. The spot E3 is formed from light scattered by the adhesive tape.

It may be noticed that both spots $E2_k$, $E2_{k+1}$ may be substantially sharp in the image IMG3, although the spots $E2_k$, $E2_{k+1}$ are caused by surfaces which are at different heights $z_k$, $z_{k+1}$. Both spots $E2_k$, $E2_{k+1}$ may simultaneously be substantially sharp in the image IMG3.

The portion POR1 of the spot $E2_k$ may correspond to a first illuminated region on the surface SRF1. The portion POR2 of the spot $E2_k$ may correspond to a second illuminated region on the surface SRF1. The portion POR3 of the spot $E2_k$ may correspond to a third illuminated region on the surface SRF1. The illuminated regions may be spatially adjacent on the surface SRF1.

Figure 8A:
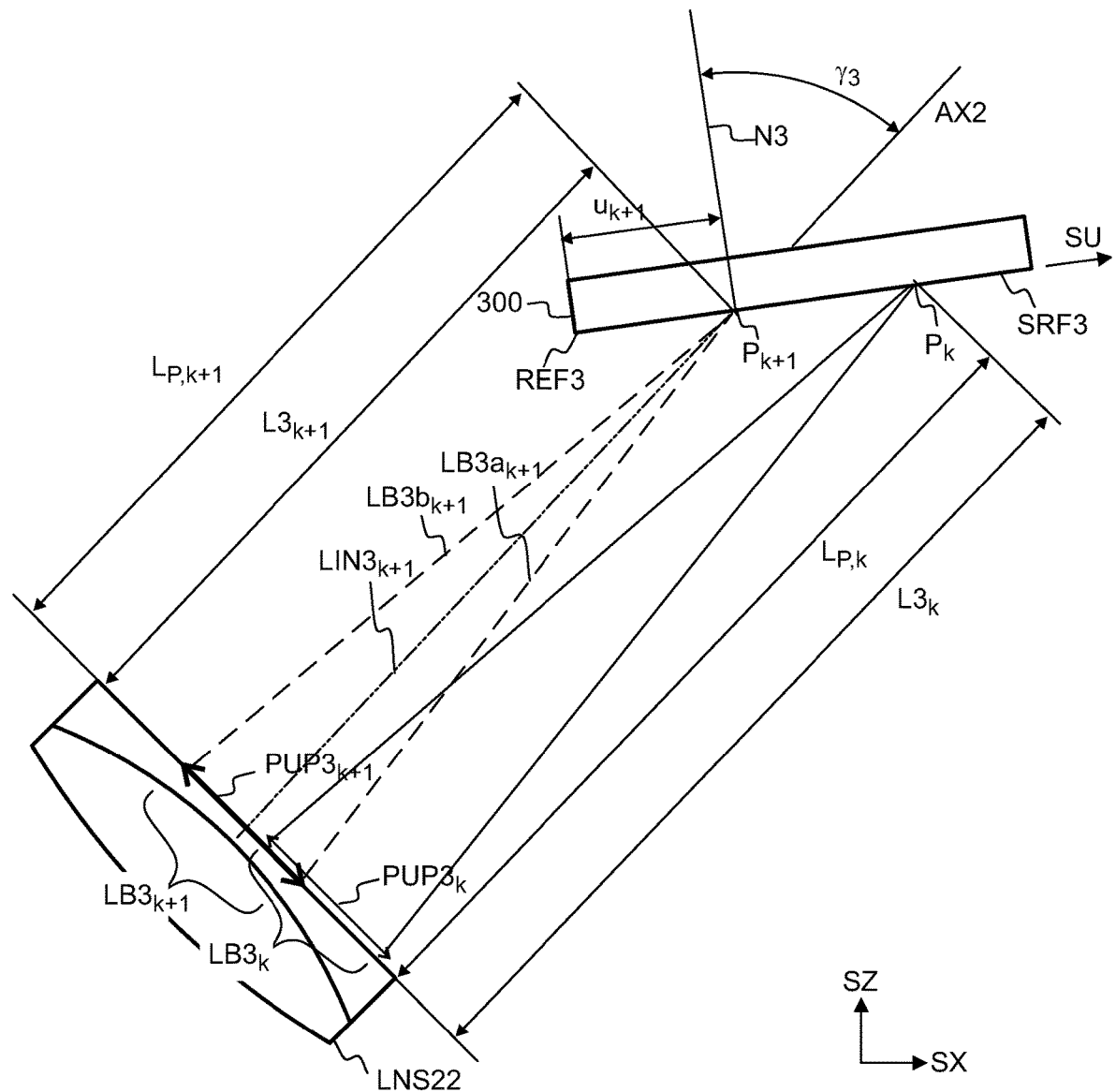
FIG. 8a shows, by way of example, in a side view, an orientation of the image sensor for measuring the height of a glossy surface.
Figure 8B:
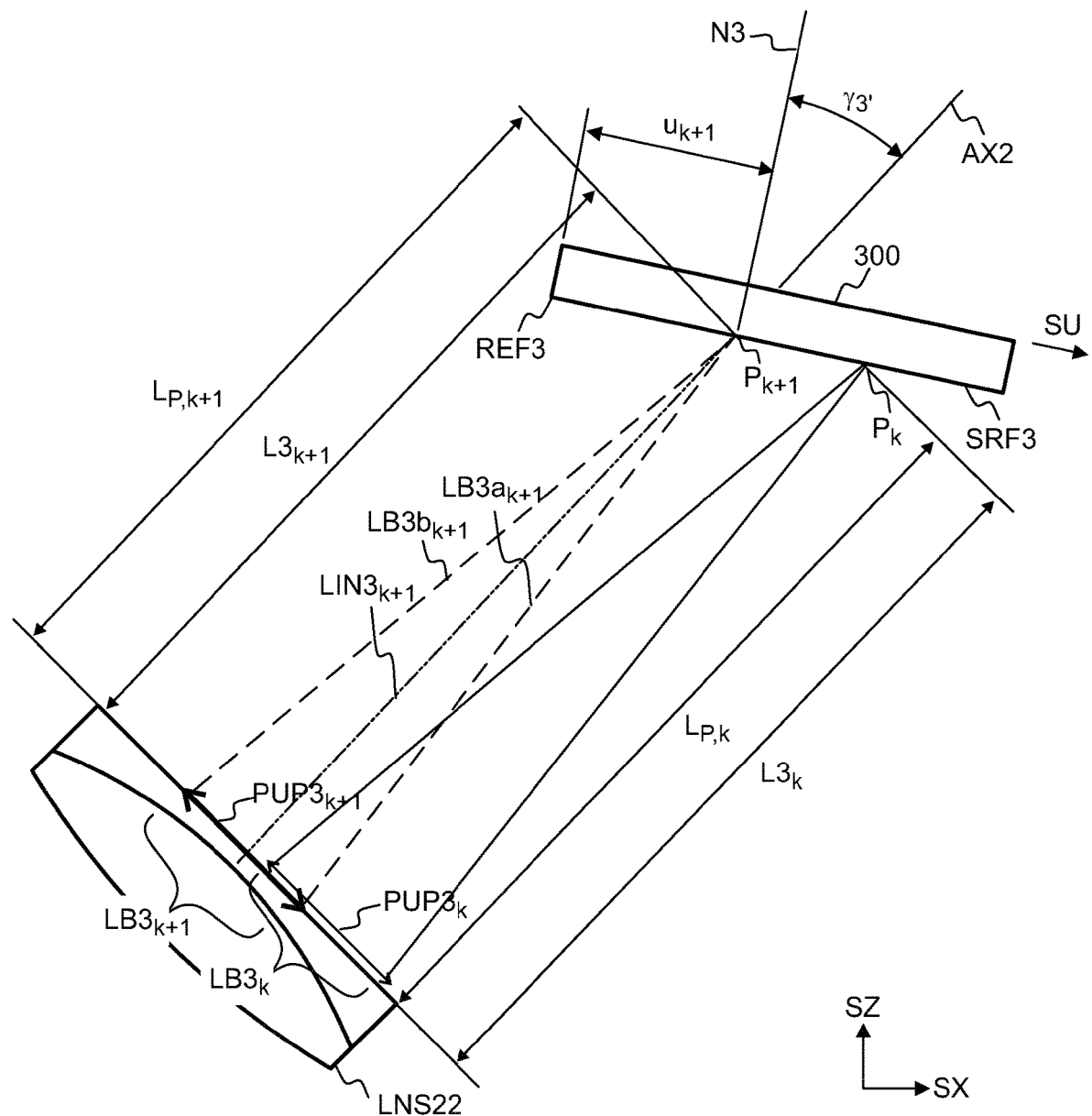
FIG. 8b shows, by way of example, in a side view, an orientation of the image sensor for measuring the height of a diffusing surface.

FIG. 8a shows, by way of example, an orientation of the image sensor 300 for measuring the height of a glossy surface SRF1. FIG. 8b shows, by way of example, an orientation of the image sensor 300 for measuring the height of a diffusing surface SRF1.

Referring to FIGS. 8a and 8b, reflection from a first reflection point $R_k$ may provide a first focused beam $LB3_k$, and reflection from a second reflection point $R_{k+1}$ may provide a second focused beam $LB3_{k+1}$. $L3_k$ may denote the axial distance between the principal point of output lens L22 and the waist of a first focused beam $LB3_k$. $L3_{k+1}$ may denote the axial distance between the principal point of output lens L22 and the waist of a second focused beam $LB3_{k+1}$.

The image points $P_k$, $P_{k+1}$ are located on the surface SRF3 of the image sensor 300. The distance between the image point $P_k$ and the waist of the first focused beam $LB3_k$ may depend on the orientation of the image sensor 300. The distance between the image point $P_{k+1}$ and the waist of the second focused beam $LB3_{k+1}$ may also depend on the orientation of the image sensor 300. The sensor 300 may be installed in an inclined orientation such that the distance $L_{P,k}$ between the output lens L22 and the image point $P_k$ is substantially equal to the distance $L3_k$, and such that the distance $L_{P,k+1}$ between the output lens L22 and the image point $P_{k+1}$ is substantially equal to the distance $L3_{k+1}$. The distances $L3_k$, $L3_{k+1}$, $L_{P,k}$, $L_{P,k+1}$ may be measured in the direction of the optical axis AX2.

Figure 11:
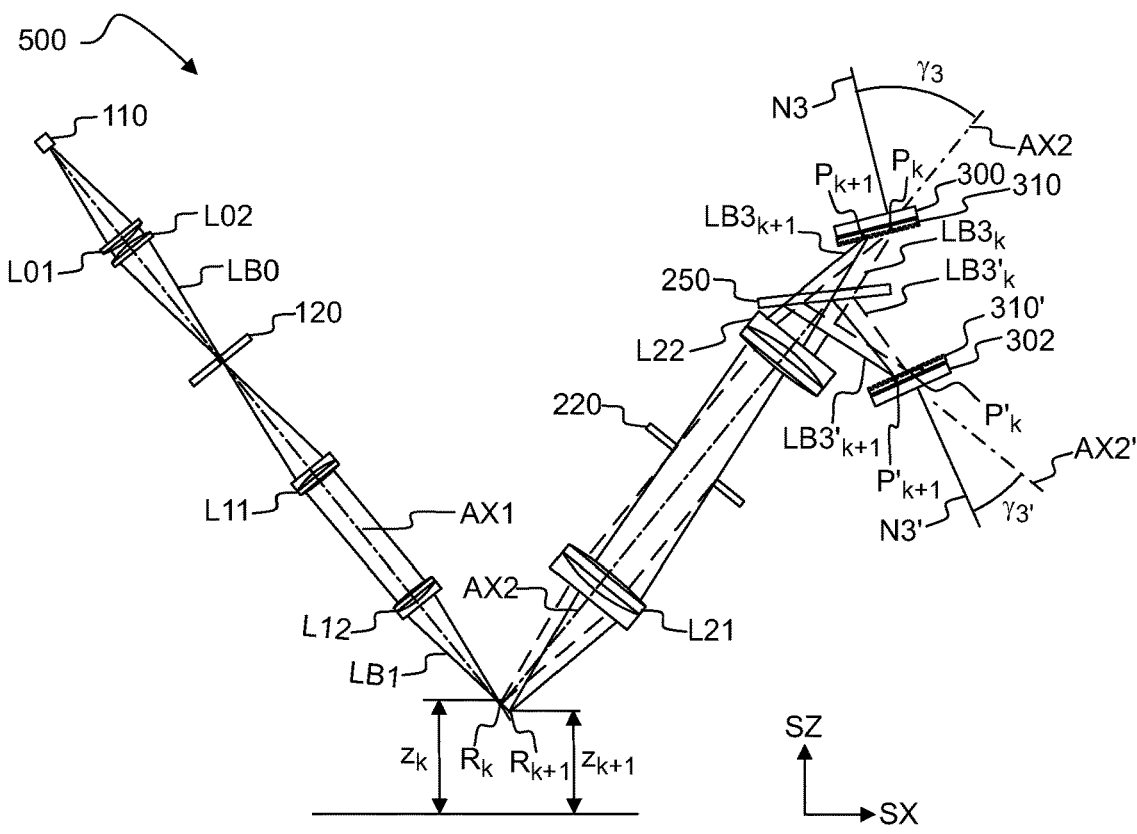
FIG. 11 shows, by way of example, in a side view, optical elements of a measuring device arranged to measure the height of glossy and diffusive surfaces.

The focusing optics 200 may be arranged to form a first focused spot $E2_k$ on the image sensor 300, 302 by providing a first focused beam $LB3_k$ from light $LB2_k$ reflected from a first illuminated region $E1_k$ which is at a first height $z_k$, and the focusing optics 200 may be arranged to form a second focused spot $E2_{k+1}$ on the image sensor 300, 302 by providing a second focused beam $LB3_{k+1}$ from light $LB2_{k+1}$ reflected from a second illuminated region $E1_{k+1}$ which is at a second different height $z_{k+1}$. (An image sensor 302 is shown in FIG. 11). The image sensor 300, 302 may be inclined such that the position of the waist of the first focused beam $LB3_k$ substantially coincides with the position of the first focused spot $E2_k$, and such that the position of the waist of the second focused beam $LB3_{k+1}$ substantially coincides with the position of the second focused spot $E2_{k+1}$.

In case of specular reflection from a glossy surface SRF1, the distance $L3_k$ may decrease when the reflection point $R_k$ is changed to a lower position. The sensor 300 may be tilted such that light from a first reflection point $R_k$ is focused to a first image point $P_k$, light from a second reflection point $R_{k+1}$ is focused to a second image point $P_{k+1}$, the vertical position $z_{k+1}$ of the second reflection point $R_{k+1}$ is lower than the vertical position $z_k$ of the first reflection point $R_k$, and the distance $L_{P,k+1}$ is shorter than the distance $L_{P,k}$. When the sensor is arranged to detect specular reflection, the orientation of the sensor 300 may be specified by the angle γ3.

In case of diffuse reflection from a scattering surface SRF1, the measuring device may form an image of the illuminated region on the image sensor. The distance between the illuminated region and the focusing optics 200 may change when the height of the surface is changed, depending on the orientation of the focusing optics and the orientation of the illuminating beam. Consequently, the distance $L3_k$ may also be changed when the reflection point $R_k$ is changed to a lower position. The sensor 300, 302 may be tilted such that light from a first reflection point $R_k$ is focused to a first image point $P_k$, light from a second reflection point $R_{k+1}$ is focused to a second image point $P_{k+1}$, the vertical position $z_{k+1}$ of the second reflection point $R_{k+1}$ is lower than the vertical position $z_k$ of the first reflection point $R_k$, and the distance $L_{P,k+1}$ is different than the distance $L_{P,k}$. In case of diffuse reflection, the sensor 300, 302 may be tilted such that the orientation of the sensor is specified by the angle γ3'. An angle γ3' suitable for detecting diffuse reflection may be different from the angle γ3 suitable for detecting specular reflection. An optimum orientation angle γ3' for detecting diffuse reflection may be different from an optimum orientation angle γ3 for detecting specular reflection.

Figure 9:
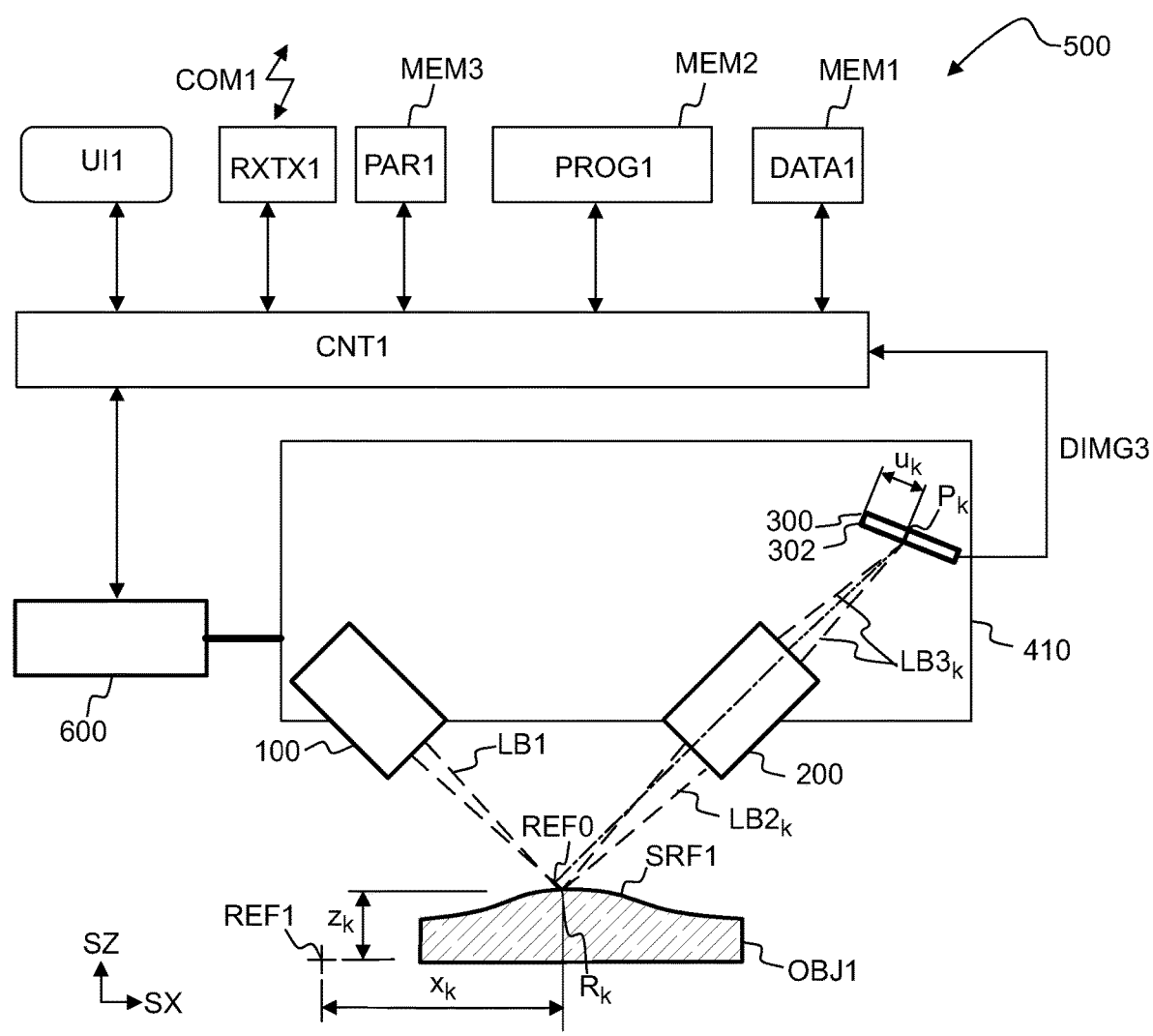
FIG. 9 shows, by way of example, functional units of the measuring device.

FIG. 9 shows, by way of example, functional units of the measuring device 500. The measuring device 500 may comprise the illuminating unit 100, the focusing unit 200, and the image sensor 300. The image sensor 300 may convert the optical image IMG3 into a digital image DIMG3. The measuring device 500 may comprise a control unit CNT1. The control unit CNT1 may obtain the digital image DIMG3 from the image sensor 300. The digital image DIMG3 may be analyzed by the control unit CNT1, e.g. in order to detect the position of a spot $E2_k$, $E2_{k+1}$. The digital image DIMG3 may be processed by the control unit CNT1 to detect the position of a spot $E2_k$, $E2_{k+1}$. The measuring device 500 may comprise a memory MEM1 for storing measured data DATA1, a memory MEM2 for storing computer program code PROG1, and a memory MEM3 for storing calibration data PAR1. The measuring device 500 may be arranged to measure the height $z_k$ of a surface SRF3 according to the computer program code PROG1. The control unit CRT1 may comprise one or more data processors. The program code PROG1 may be configured to, when executed by the one or more data processors, to carry out determining the height $z_k$ from the position $u_k$ of the spot $E2_k$. The measuring device 500 may optionally comprise an actuator unit 600 for moving the intersection point REF0 with respect to the surface SRF1 and/or for moving the surface SRF1 with respect to the intersection point REF0. The actuator 600 may be arranged to move the optics 100, 200 and/or to move the surface SRF1. The measuring device 500 may optionally comprise a communication unit RXTX1 for receiving data and/or for transmitting data. For example, measured data DATA1 may be transmitted via the communication unit RXTX1. For example, measured data DATA1 may be transmitted via the communication unit RXTX1 to the Internet. COM1 denotes a communication signal. The measuring device 500 may optionally comprise a user interface UI1 for receiving user input from a user and/or for providing output to a user. For example, the user interface UI1 may comprise a touch screen for receiving user input and for displaying information.

Figure 10:
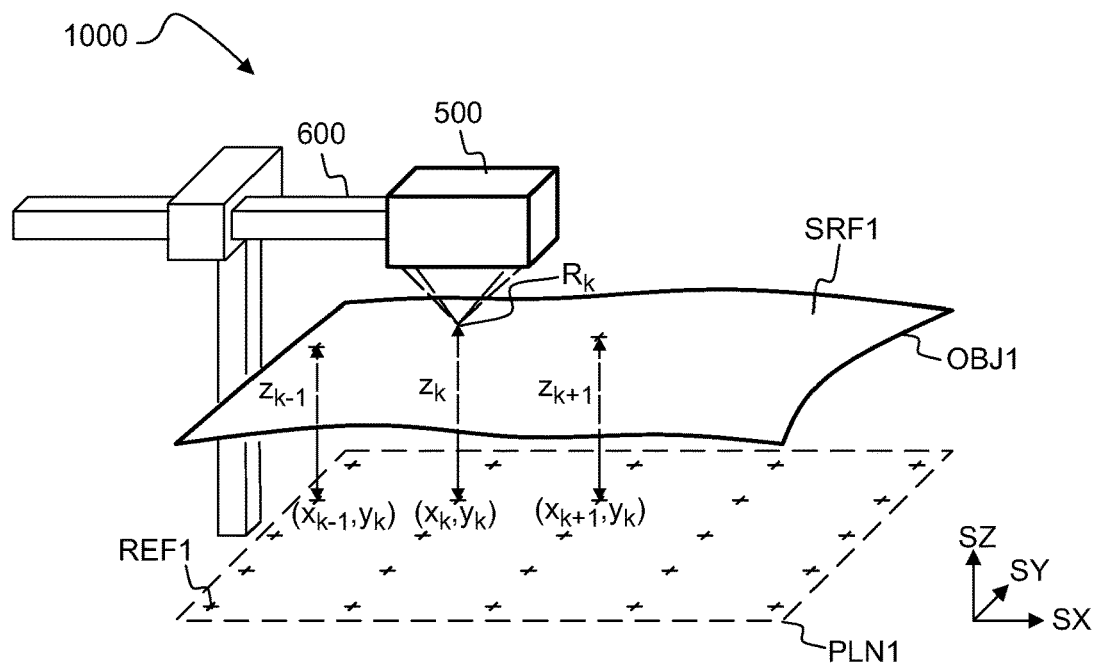
FIG. 10 shows, by way of example, in a three dimensional view, a measuring device, which is arranged to measure the height of a surface at several different locations.

Referring to FIG. 10, a measurement apparatus 1000 may comprise the measuring device 500 and an actuator unit 600. The actuator unit 600 may be arranged to move the combination of the illuminating unit 100 and the focusing unit 200 with respect to the surface SRF1. The actuator unit 600 may be arranged to move the intersection point REF0 with respect to the surface SRF1 and/or to move the surface SRF1 with respect to the intersection point REF0.

The apparatus 1000 may be arranged to measure the height z of the surface SRF1 at several different locations. The locations may be specified e.g. by coordinates $(x_{k-1},y_k)$, $(x_k,y_k)$, $(x_{k+1},y_k)$, ..., $(x_k, y_{k+1})$, ... The locations $(x_{k-1},y_k)$, $(x_k,y_k)$, $(x_{k+1},y_k)$, ... may be arranged e.g. in a substantially rectangular grid. The apparatus 1000 may be arranged to measure a plurality of heights $z_{k-1}$, $z_k$, $z_{k+1}$, ... such that each height is associated with a longitudinal position coordinate $x_{k-1}$, $x_k$, $x_{k+1}$, ... The apparatus 1000 may be arranged to measure a first height $z_k$ at a position $x_k$ of the surface SRF1, and the apparatus 1000 may be arranged to measure a second height $z_{k+1}$ at a position $x_{k+1}$ of the surface SRF1.

The apparatus 1000 may be arranged to compensate the error $e_k$ between the intersection point REF0 and the actual measurement point $R_k$ (see FIG. 3). The device 500 or the apparatus 1000 may be configured to determine a correction value $e_k$ associated with a determined height value $z_k$. The correction value $e_k$ may specify a transverse distance between a nominal measurement location $x_0$ and an actual measurement location $x_k$.

An error value $e_k$ associated with a measurement point may be determined from the measured height $z_k$ e.g. by using previously determined table stored in a memory. An error value $e_k$ associated with a measurement point may be determined from the measured height $z_k$ e.g. by using a regression function e(z), wherein the parameters of the regression function e(z) may be stored in a memory. The measuring device 500 may comprise said memory. The apparatus 1000 may comprise said memory. The apparatus 1000 may be arranged to provide a longitudinal displacement value $e_k$ associated with a longitudinal position $x_k$ from a measured height value $z_k$. The apparatus 1000 may be arranged to provide a longitudinal displacement value $e_k$, $e_{k+1}$, ... for each longitudinal position $x_k$, $x_{k+1}$, ... of a measurement point.

The nominal measurement locations may be arranged e.g. in substantially rectangular two-dimensional grid. The actual measurement locations may slightly deviate from the nominal measurement locations. A height value $z_{k,est}$ at a nominal measurement location may be determined from the measured height value $z_k$ e.g. by interpolation. The device 500 or the apparatus 1000 may be configured to provide a plurality of interpolated height values $z_{k,est}$ from the measured height values $z_{k, zk+1}$ such that each interpolated height value is associated with a point $(x_k, y_k)$ of an array. The array may be a rectangular two-dimensional array.

The direction SZ may be substantially parallel to the direction of gravity or substantially opposite to the direction of gravity. However, the surface SRF1 may also have an arbitrary orientation, and the orientation of the reference plane PLN1 does not need to be horizontal with respect to the direction of gravity. The reference plane PLN1 may have an arbitrary orientation, and the direction SZ may refer to a direction, which is substantially perpendicular to the reference plane PLN1. The direction SZ does not need to be parallel to the direction of gravity. The "height" or "vertical position" may specify the distance of a point of the surface SRF1 from the reference plane PLN1 in the direction SZ.

Referring to FIG. 11, the measuring device 500 may be suitable for measuring vertical positions of glossy surfaces and for measuring vertical positions of diffusing surfaces. The measuring device 500 may be arranged to measure the vertical position $z_k$ of the surface SRF1 when the light is reflected from a glossy portion of the surface SRF1, and to measure the vertical position $z_k$ of the surface SRF1 when the light is reflected from a diffusing portion of the surface SRF1.

The measuring device 500 may comprise a first image sensor 300 and a second image sensor 302. The focused beams $LB3_k$ and $LB3_{k+1}$ may be split into a first part and a second part e.g. by using a beam splitter 250. The first part of the beam $LB3_k$ may impinge on the first sensor 300 to form a spot $E2_k$ at the point $P_k$. The second part of the beam $LB3_k$ may impinge on the second sensor 302 to form a focused spot also at the point $P'_k$. The first part of the beam $LB3_{k+1}$ may impinge on the first sensor 300 to form a spot $E2_{k+1}$ at the point $P_{k+1}$. The second part of the beam $LB3_{k+1}$ may impinge on the second sensor 302 to form a focused spot also at the point $P'_{k+1}$.

The vertical position $z_k$ may be determined from an optical image IMG3 formed on the first image sensor 300 when the surface SRF1 is glossy, and the vertical position $z_k$ may be determined from an optical image IMG3 formed on the second image sensor 302 when the surface SRF1 is diffusing. The vertical position $z_k$ may be determined from a digital image DIMG3 obtained from the first image sensor 300 when the surface SRF1 is glossy, and the vertical position $z_k$ may be determined from a digital image DIMG3 obtained from the second image sensor 302 when the surface SRF1 is diffusing. The vertical position $z_k$ may be determined from the position $u_k$ of a spot E2 formed on the first image sensor 300 when the surface SRF1 is glossy, and the vertical position $z_k$ may be determined from the position $u_k$ of a spot E2 formed on the second image sensor 302 when the surface SRF1 is diffusing.

The orientation of the second image sensor 302 may be different from the orientation of the first image sensor 300. The beam splitter 250 may form a reflected optical axis AX2' for the focusing optics 200. The reflected optical axis AX2' may be substantially parallel with the central axis of the reflected part $LB3'_k$ of the focused light beam $LB3_k$. The reflected optical axis AX2' may also be substantially parallel with the central axis of the reflected part $LB3'_{k+1}$ of the focused light beam $LB3_{k+1}$. The second sensor 302 may be inclined with respect to the reflected optical axis AX2'. The orientation of the first sensor 300 may be specified by the angle γ3. The orientation of the second sensor 302 may be specified by the angle γ3'. The angle γ3 may mean the angle between the optical axis AX2 and the normal N3 of the sensor 300. The angle γ3' may mean the angle between the reflected optical axis AX2' and the normal N3' of the sensor 302.

The second image sensor 302 may be similar to the first image sensor 300. For example, both sensors may be CMOS sensors. The device 500 may optionally comprise a first deflecting element 310 for the first sensor 300, and a second deflecting element 310' for the second sensor 302. In particular, the device 500 may comprise a first grating 310 and a second grating 310'.

All drawings except FIG. 7a are schematic. FIG. 7c represents an actual optical image formed on the image sensor during an experiment.

The telecentric optical system of the illuminating unit 100 and/or the telecentric optical system of the focusing unit 200 may also be implemented e.g. by using Fresnel lenses. The use of Fresnel lenses may allow reduction of size, cost and/or weight of the telecentric optics. In particular, the input lens L21 may be a Fresnel lens or may comprise a Fresnel lens in order to provide a large input pupil $PUP2_k$.

The illuminated slit 120 of the illuminating unit 100 may be replaced with a substantially linear light emitting region, e.g. by a substantially linear array of light-emitting diodes or by the filament of a tungsten halogen lamp. The spectral bandwidth of the light may be optionally limited e.g. by using a spectral filter. The illuminating unit 100 and/or the focusing unit 200 may comprise a spectral filter to limit the spectral bandwidth of light transmitted to the sensor. Using a narrow spectral bandwidth may reduce the effect of chromatic aberrations. The focusing unit 200 may comprise a spectral filter in order to reject stray light.

The measuring device 500 may be arranged to measure the height $z_k$ of the surface SRF1 when the distance $h_k$ between the surface SRF1 and the illuminated spot $SP1_k$ is smaller than or equal to a maximum limit. The dimensions of the measuring device 500 may be selected such that said maximum limit is e.g. substantially equal to 1 mm, 2 mm, 5 mm, 10 mm, 20 mm, or even 50 mm. The measuring device 500 may be arranged to measure e.g. the shape of a glossy metal plate, railway rail, or wet asphalt. The measuring device 500 may be arranged to measure the flatness of a glossy metal plate, the flatness of a railway rail, the flatness of wet concrete, or the flatness of wet asphalt. In an embodiment, the distance between the illuminated region and the input lens L21 may be large, e.g. greater than 1 m, greater than 2 m, greater than 5 m, or even greater than 10 m.

The device 500 may be configured to determine a height value ($z_k$) from the detected position ($u_k$) of the focused spot E2.

For the person skilled in the art, it will be clear that modifications and variations of the devices and the methods according to the present disclosure are perceivable. The figures are schematic. The particular embodiments described above with reference to the accompanying drawings are illustrative only and not meant to limit the scope of the invention, which is defined by the appended claims.

The invention claimed is:

1. A measuring device, comprising:
an illuminating unit arranged to project an illuminating light beam on a surface of a target object so as to form an illuminated region on the surface,
a first image sensor,
a second image sensor, and
focusing optics to form a focused spot on the first image sensor, and to form an image of the illuminated region on the second image sensor,
wherein the illuminating unit is arranged to project the illuminating light beam such that the illuminating beam has a waist, the focusing optics is a telecentric system arranged to form the focused spot as an image of the waist, wherein the focusing optics are arranged to form the focused spot by focusing light from the waist reflected from the surface such that a detected position of the focused spot depends on a height of the surface with respect to a reference plane, wherein a normal of the first image sensor is inclined with respect to an optical axis of the focusing optics so that the focused spot formed on the first image sensor remains substantially sharp in a situation where the height of the surface is changed, wherein the device is configured to determine the height of the surface from the detected position of the focused spot in a situation where the surface is glossy and said waist is located above the target object,
wherein the device is configured to determine the height of the surface from a detected position of the image of the illuminated region in a situation where the surface of the target object is diffusing.

2. The measuring device of claim 1, wherein the focusing optics is arranged to form the image of the waist on the first image sensor also when the waist is above the illuminated region.

3. The measuring device according to claim 1, wherein the tilt angle between the normal of the first image sensor and the optical axis of the focusing optics is in the range of 10° to 80°.

4. The measuring device according to claim 1, comprising a beam deflecting element arranged to receive a focused beam from the focusing optics, and to provide a deflected beam to the first image sensor by deflecting light of the focused light beam.

5. The measuring device of claim 4, wherein the beam deflecting element is a diffraction grating.

6. The measuring device according to claim 1, wherein the spectral bandwidth of the illuminating beam is narrower than 10 nm.

7. The measuring device according to claim 1, wherein the illuminating light beam has a convergence angle, the focusing optics has a light gathering angle, and the ratio of the convergence angle to the light gathering angle is in the range of 50% to 100%.

8. The measuring device according to claim 1, wherein the illuminating unit comprises an illuminated slit, and projection optics, wherein the projection optics is arranged to provide the illuminating beam by focusing light transmitted through the illuminated slit.

9. The measuring device according to claim 1 comprising an actuator unit to move the combination of the illuminating unit and the focusing optics with respect to the surface.

10. A method, comprising:
forming an illuminated region on a surface of a target object,
forming a focused spot on a first image sensor by focusing light reflected from the surface such that the position of the focused spot depends on the height of the surface with respect to a reference plane, wherein the illuminated region is formed by projecting an illuminating light beam such that the illuminating light beam has a waist, the focused spot is formed as an image of the waist, the focused spot is formed by using telecentric focusing optics, wherein the normal of the first image sensor is inclined with respect to the optical axis of the focusing optics so that the focused spot formed as an image of the waist on the first image sensor remains substantially sharp in a situation where the height of the surface is changed,
wherein the method comprises determining the height of the surface from a detected position of the focused spot in the situation where the surface is glossy and said waist is located above the target object,
wherein the focusing optics are arranged to form an image of the illuminated region on the second image sensor in a situation where the surface of the target object is diffusing,
wherein the method comprises determining the height of the surface from a detected position of the image of the illuminated region in the situation where the surface of the target object is diffusing.

11. The method according to claim 10, wherein the focusing optics is arranged to form the image of the waist on the first image sensor also when the waist is above the illuminated region.

12. The method according to claim 10, wherein the tilt angle between the normal of the first image sensor and the optical axis of the focusing optics is in the range of 10° to 80°.

* * * * *